(12) United States Patent
Zhang et al.

(10) Patent No.: US 9,448,306 B1
(45) Date of Patent: Sep. 20, 2016

(54) METHODS AND APPARATUS FOR SELF-ASSISTING POSITIONING SYSTEM

(71) Applicant: Marvell International Ltd., Hamilton (BM)

(72) Inventors: Wentao Zhang, Cupertino, CA (US); Victor Lin, Fremont, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 149 days.

(21) Appl. No.: 13/964,991

(22) Filed: Aug. 12, 2013

Related U.S. Application Data

(62) Division of application No. 12/917,989, filed on Nov. 2, 2010, now Pat. No. 8,510,077.

(60) Provisional application No. 61/263,738, filed on Nov. 23, 2009.

(51) Int. Cl.
*G01S 19/25* (2010.01)

(52) U.S. Cl.
CPC ..................................... *G01S 19/25* (2013.01)

(58) Field of Classification Search
USPC .......................................................... 702/150
See application file for complete search history.

(56) References Cited

U.S. PATENT DOCUMENTS

| 8,510,077 | B1 | 8/2013 | Zhang et al. | |
| 2002/0146983 | A1* | 10/2002 | Scherzer | H04W 24/02 455/67.11 |
| 2004/0066347 | A1* | 4/2004 | Schiff | 343/776 |

OTHER PUBLICATIONS

Sri Phani Yerubandi, Integrity Monitoring in WLAN Positioning Systems, Proc. of SPIE vol. 7351, Apr. 28, 2009, 13 pages.

* cited by examiner

*Primary Examiner* — Tung Lau

(57) ABSTRACT

In a method of implementing a positioning system a buffer is configured to store a buffer record for each of a plurality of position fixes determined by the receiver and a database is configured to store a database record for each of the position fixes. Buffer records are accumulated, with each buffer record corresponding to one of the position fixes determined by the receiver. A first threshold position near an area in which a degradation event occurs is identified and recorded in a first database record. A second threshold position near the area is identified in a second database record. The second threshold position is indicated by one of the position fixes outside of the area and is proximate to a position at which the degradation event ends.

16 Claims, 19 Drawing Sheets

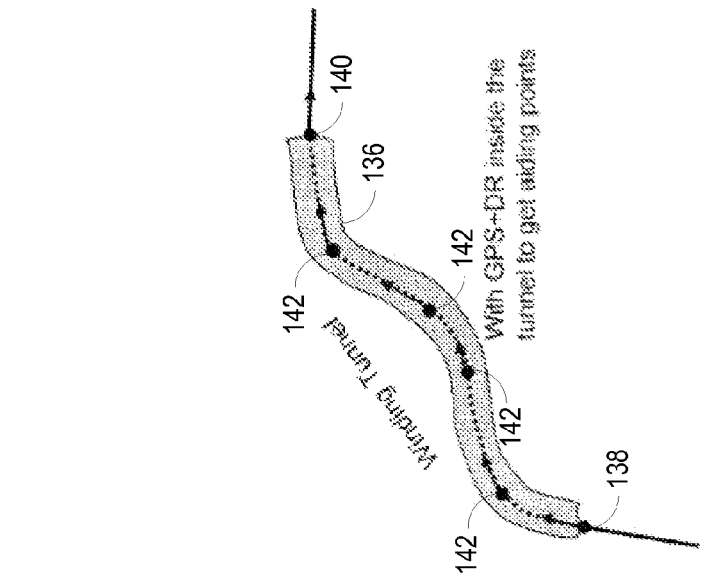
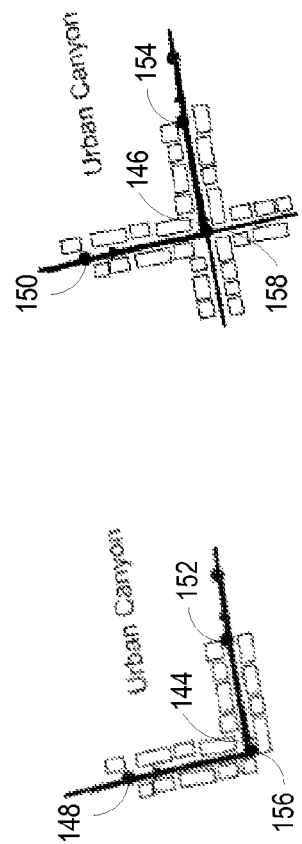
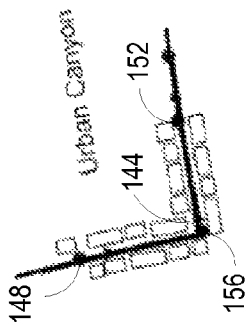
FIG. 4A
FIG. 4B
FIG. 4C
FIG. 4D
FIG. 4E

METHODS AND APPARATUS FOR SELF-ASSISTING POSITIONING SYSTEM

CROSS-REFERENCES TO RELATED APPLICATIONS

The present application is a divisional of U.S. patent application Ser. No. 12/917,989, now U.S. Pat. No. 8,510,077, entitled "Methods and Apparatus for Self-Assisting Positioning System," filed Nov. 2, 2010, which claims the benefit of U.S. Provisional Patent Application No. 61/263,738, entitled "SELF-ASSISTING GPS (SAGPS) TECHNOLOGY-I," filed on Nov. 23, 2009, each of which is hereby incorporated by reference herein in its entirety.

FIELD OF THE DISCLOSURE

The present disclosure relates generally to the field of positioning systems, and more particularly, to positioning system receivers implementing self-assistance databases.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the advent of the space age in the mid-twentieth century, global satellite navigation systems (GNSS) developed to allow autonomous geo-spatial positioning, often with global coverage. Such global coverage is generally achieved by a constellation of satellites, often 20 or more, in medium Earth orbit. Carefully timed signals received from the satellites in known orbits allow the receiver of the information to determine, with varying degrees of accuracy, the distance of the receiver from each satellite. Using signals from four or more satellites (three if the altitude of the receiver is known), the position of the receiver can be determined with relative accuracy. The Global Positioning System (GPS), also known as Navstar, is one implementation of a GNSS, and is maintained by United States government. Depending on the receiver, atmospheric effects, errors in calculated satellite orbits, multipath distortion, and clock errors, among other things, GPS has an accuracy on the order of 1-10 meters.

In some situations, available GPS signals do not provide sufficient accuracy for the intended application. For example, while accuracy on the order of one meter (or even five meters) may be sufficient for GPS implemented in the automotive environment (e.g., to provide navigation information to automobile drivers), certain other applications, such as surveying and techtonics (e.g., direct measurement of fault motion), require much greater accuracy, on the order of a few millimeters in the case of surveying. In other situations, GPS signals are unavailable or subject to degradation. In tunnels, for example, GPS signals are often unavailable to the GPS receiver, rendering the GPS device unable to calculate any position at all. In other environments, such as city streets having tall buildings on either side (known colloquially as "urban canyons"), the buildings may block one or more GPS signals entirely, and multipath effects may degrade receiver accuracy. A number of technologies exist to increase the accuracy of the GPS system, including, among others, Assisted GPS (AGPS), Differential GPS (DGPS), GPS with dead reckoning, and map matching.

Assisted GPS (AGPS) can improve the performance of a GPS satellite-based positioning system. AGPS achieves performance gains by, among other things, using data available from a network, such as a mobile (e.g., cellular) telephone network or the Internet, to: (1) assist GPS receiver devices in attaining initial GPS signal acquisition by, for example, supplying orbital data of the GPS satellites to enable the receiver to lock to the satellites more quickly; (2) provide knowledge of conditions (e.g., ionospheric conditions) affecting local GPS signals, thereby decreasing the errors affecting accuracy; and/or (3) utilizing one or more servers to calculate the position of the GPS receiver device, to reduce the load on or delays associated with the processor in the GPS receiver.

Differential GPS (DGPS) uses data about the difference between positions indicated by the satellite systems and known fixed positions. The data are generated and broadcast by a network of fixed, ground-based reference stations. Different geographical regions operate different DGPS systems, with no single standard dominating. Europe, Canada, and the United States each have different DGPS systems operating within their borders.

In some GPS systems, dead reckoning (DR) and/or inertial navigation (IN) allows estimation of position during periods where GPS signals are degraded or unavailable. Speed sensors (e.g., the speedometer on an automobile), radar systems, electronic compasses, accelerometers, and the like may provide data to the GPS device to use with the data last calculated using GPS signals. Throughout this specification, systems that implement a combination of GPS and DR and/or IN are referred to generally as GPS+DR systems.

In still other systems, a GPS device calculates a position based on received GPS signals and, by referring to one or more maps of the area around the calculated position, corrects the position to match a probable location. For example, in an automotive GPS device, the device may assume that the vehicle in which it operates is on a road and, accordingly, may determine that the position of the device is at a point on a road closest to the position calculated from received GPS signals. Throughout the specification, the method implemented by such systems is referred to as "map matching."

AGPS, DGPS, GPS+DR, and map matching, while improving position accuracy and/or availability, all have significant drawbacks. AGPS and DGPS, for example, each require additional networks of transmitters and/or receivers, as well as additional receivers (and sometimes transmitters) in the GPS device. GPS+DR systems require additional sensors, located within or at least in communication with the device and, because new positions are calculated from old positions, the position fix accumulates over time. Map matching requires often significant digital storage space to store maps, especially to cover large geographical areas or dense urban areas. Map matching also suffers degradation of accuracy as maps become outdated.

SUMMARY

In one embodiment, a method of implementing a positioning system includes implementing a buffer configured to store a buffer record for each of a plurality of position fixes determined by a positioning system receiver and a database configured to store a database record for each of the plurality of position fixes. Buffer records are accumulated, with each buffer record corresponding to one of the position fixes determined by the receiver. A first threshold position near an area in which a degradation event occurs is identified, and the first threshold position is recorded in a first database record. A second threshold position near the area is identified. The second threshold position is indicated by one of the position fixes outside of the area and is proximate to a position at which the degradation event ends. The second threshold position is recorded in a second record of the database stored in a memory location that can be determined from the first database record. The first database record is stored in a memory location that can be determined from the second database record.

In another embodiment, an apparatus includes a positioning system receiver. A processor communicatively coupled to the positioning system receiver is also coupled to a memory buffer and a database. One or more routines executed by the process are collectively operable to cause accumulation in the buffer of a plurality of buffer records. Each buffer record is for a corresponding one of a plurality of position fixes of the positioning system receiver. The one or more routines are also operative to identify a first threshold position near an area of degraded signal reception, record the first threshold position in a first database record of the database, identify a second threshold position near the area of degraded signal reception, and record the second threshold position in a second database record of the database. The second database record is stored in a memory location determinable from the first database record, and the first database record is stored in a memory location determinable from the second database record.

In yet another embodiment, a database stored on a computer-readable medium is communicatively coupled to a processor. The database includes a plurality of record pairs. Each record pair includes (i) a first threshold position record corresponding to a first positioning system receiver location and (ii) a second threshold position record corresponding to a second positioning system receiver location. Each of the first and second threshold position records is determinable upon knowledge of the other, and the first and second positioning system receiver locations correspond respectively to a position at which a positioning system receiver's location was determined prior to a degradation of a navigation signal and a position at which the positioning system receiver's location was determined subsequent to strengthening of the navigation signal.

In still another embodiment, an apparatus includes a positioning system receiver. A processor communicatively coupled to the positioning system receiver is also coupled to a memory buffer and a database. The database stores a plurality of records. The records include a plurality of record pairs, each record pair containing a first position fix in a first record of the record pair and a second position fix in a second record of the record pair. The first position fix indicates a position of the positioning system receiver prior to a signal degradation and the second position fix indicates a position of the positioning system receiver subsequent to a signal degradation. The apparatus also includes one or more routines executed by the processor and collectively operative to calculate an estimated position for the positioning system receiver using as an input at least one of the plurality of record pairs stored in the database.

BRIEF DESCRIPTION OF THE DRAWINGS

FIGS. 4A through 4E illustrate various scenarios in which the SAGPS receiver of FIG. 1 will experience outage and degradation events.

DETAILED DESCRIPTION

Figure 1:
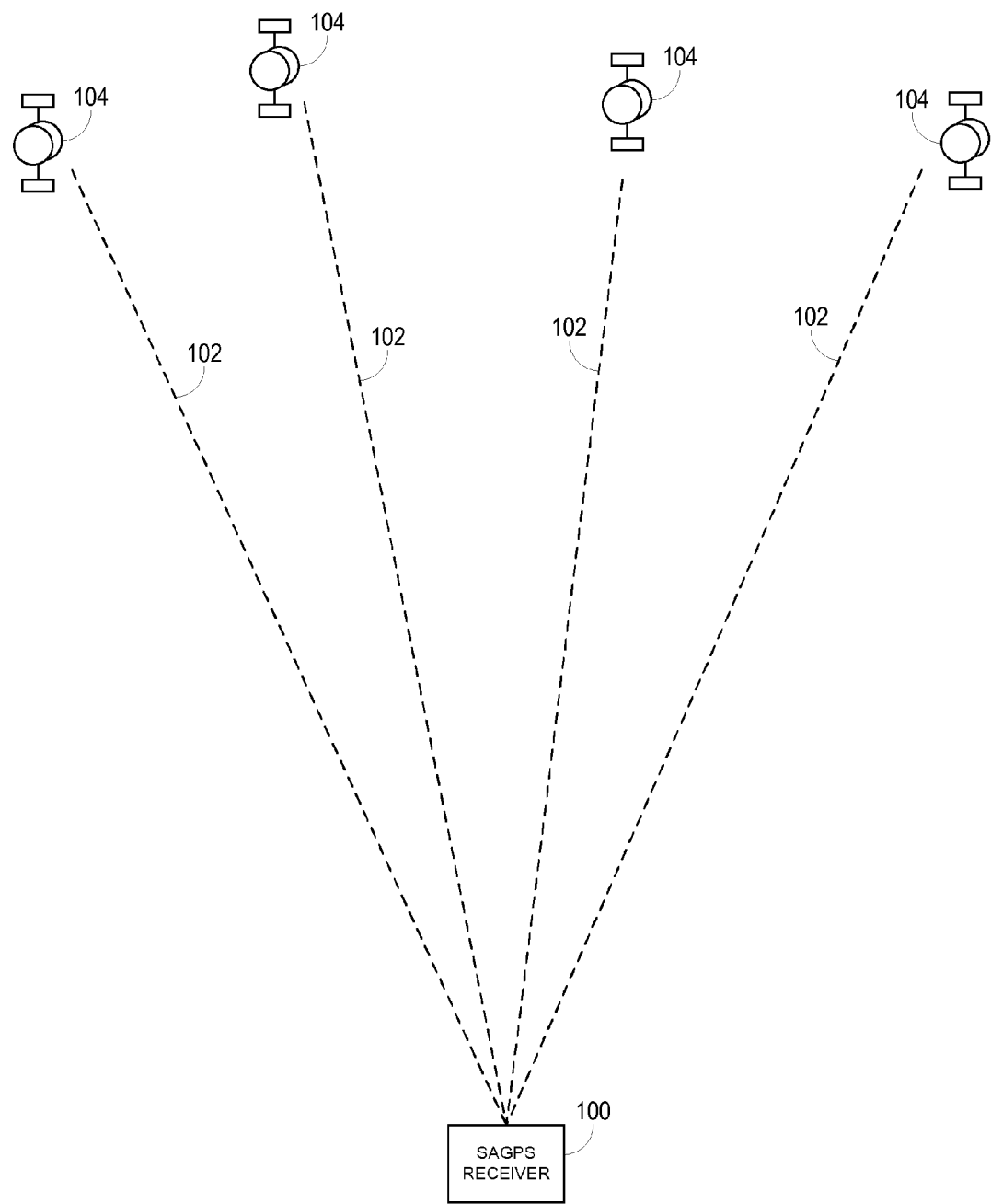
FIG. 1 depicts a portion of a self-assisting GPS (SAGPS) system including SAGPS receiver, GPS satellites, and GPS signals in accordance with the presently described embodiments.

In embodiments described below, a self-assisting global navigation satellite system (GNSS) receiver and, in particular, a self-assisting Global Positioning System (GPS) receiver, receives navigation signals from a constellation of orbiting navigation satellites (also referred to herein space vehicles, or SVs). For ease of explanation, such receivers are referred to herein as SAGPS receivers, though it should be understood that while the embodiments below are described in terms of the Global Positioning System, the described methods and apparatus could be implemented in any GNSS receiver, in any regional positioning system, and in positioning systems that not based on satellite navigation signals. FIG. 1 depicts an SAGPS receiver 100 receiving GPS signals 102 from four GPS SVs 104. Generally, the SAGPS receiver 100 requires GPS signals 102 from four or more SVs in the constellation in order to determine accurately the receiver's position. The SAGPS receiver 100 optimally has an unobstructed line of sight to each of the four or more GPS SVs 104, as depicted in FIG. 1. It should be understood that the GPS signals 102, while depicted as radiating from the GPS SVs 104 to the SAGPS receiver 100, radiate from the GPS satellites 104 so they may be received over a wide area, as it would be impractical to implement a system that radiated signals specifically intended for individual GPS receivers.

Figure 2:
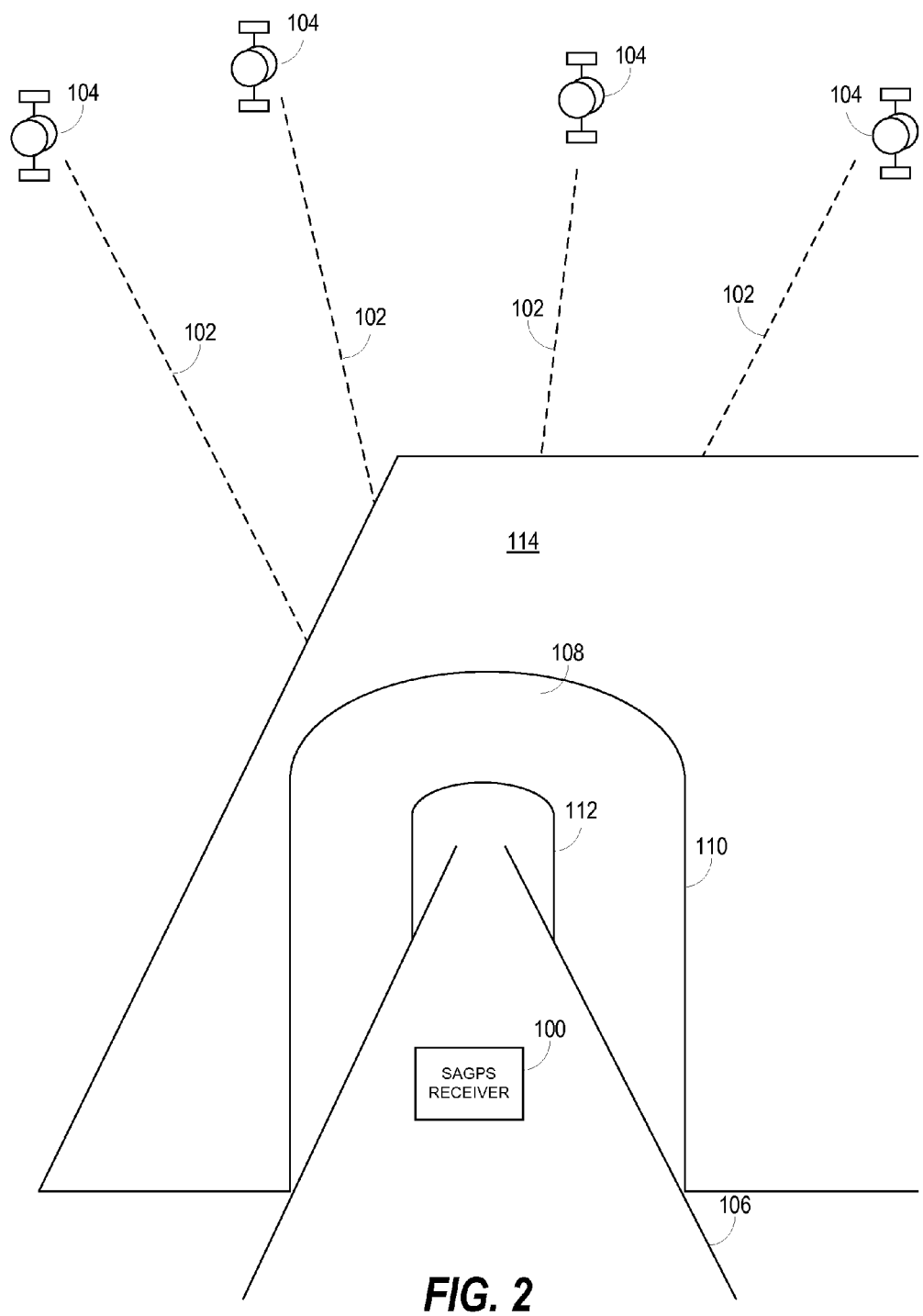
FIG. 2 depicts the SAGPS system of FIG. 1 during an outage event caused by a tunnel.

During periods in which the SAGPS receiver 100 does not have line of sight to at least four GPS SVs 104, the SAGPS receiver 100 may experience degraded accuracy or may be unable to obtain a position fix at all (an outage). Discrete periods in which these phenomena occur are referred to throughout this specification, respectively, as degradation events and outage events. FIG. 2 illustrates a scenario in which the SAGPS receiver 100 experiences an outage event. The SAGPS receiver 100 is depicted on a road 106. The road 106 passes through a tunnel 108, defined by a tunnel entrance 110 and a tunnel exit 112, which passes through a mountain (or other object) 114. The mountain 114 prevents the GPS signals 102 transmitted from the GPS SVs 104 from reaching the SAGPS receiver 100. During the period in which the SAGPS receiver 100 is inside the tunnel 108, the tunnel 108 renders the SAGPS receiver 100 unable to determine a position fix, resulting in an outage event. Depending on the location of the GPS SVs 104 relative to the SAGPS receiver 100, the SAGPS receiver 100 may continue to receive some or all of the GPS signals 102 for some distance after it passes through the tunnel entrance 110 and/or for some distance before it passes through the tunnel exit 112, in which case the SAGPS receiver 100 may experience a degradation event.

Figure 3:
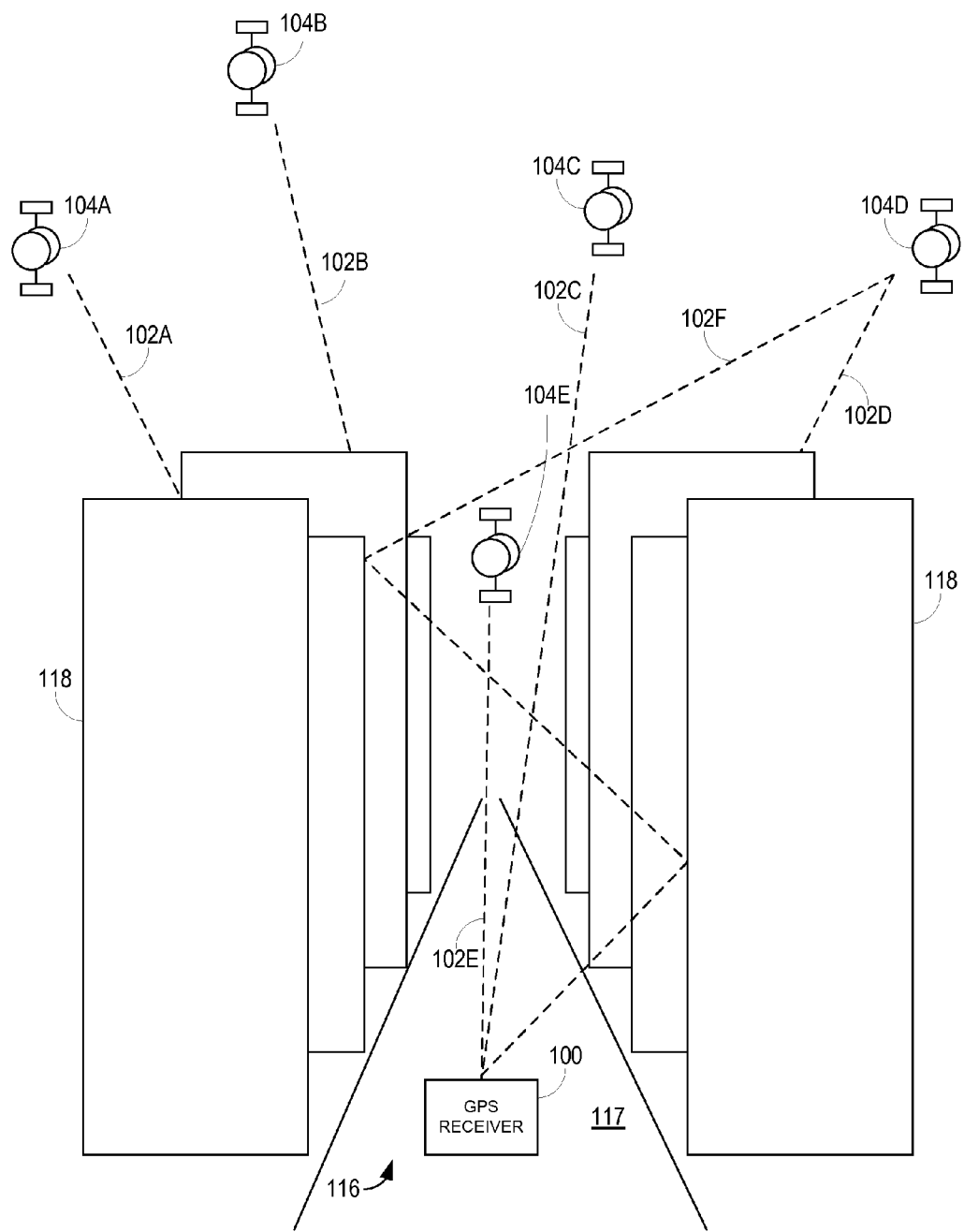
FIG. 3 depicts the SAGPS system of FIG. 1 during a degradation event caused by an urban canyon.

FIG. 3 illustrates a scenario in which the SAGPS receiver 100 experiences a degradation event. The SAGPS receiver 100 is depicted on a road 117. A plurality of GPS SVs 104A-104E are above the horizon, transmitting GPS signals 102A-102E. The road 117 passes through an urban canyon 116 formed by tall buildings 118 on either side of the road 117. The buildings 118 block some of the GPS signals 102 from being received by the SAGPS receiver 100. For example, the GPS signals 102A, 102B, and 102D are blocked by the buildings 118. The GPS SVs 104C and 104E are positioned such that the SAGPS receiver 100, despite the buildings 118, receives the corresponding GPS signals 102C and 102E. The SAGPS receiver 100 also receives a multipath GPS signal 102F (i.e., a signal identical to the GPS signal 102D, but received after reflecting off one or more of the buildings 118, delaying its reception by the SAGPS receiver 100, and causing degradation of the corresponding position fix). Because the SAGPS receiver 100 receives only three of the GPS signals 102A-102F, and because one of the three received GPS signals (i.e., 102F) is a multipath signal, the SAGPS receiver 100 experiences a degradation event while in the urban canyon 116.

While described throughout the specification with respect to tunnels and/or urban canyons, outage and degradation events can result from any number of phenomena. For instance, dense foliage, a highway overpass, weather, or other vehicles can cause an outage or degradation event. Additionally, throughout the remainder of the specification, the phrase "degradation event" is intended to include events in which the SAGPS receiver 100 cannot make an accurate GPS position fix (i.e., to include outage events). That is, an outage event is a type of degradation event.

The methods and apparatus described herein allow the SAGPS receiver 100 to function during outage and degradation events such as those described above, albeit with potentially decreased accuracy, provided that the SAGPS receiver 100 has access to prior data about the areas in which the degradation events (e.g., the tunnel 108 and the urban canyon 116) are likely to occur. For example, the first time the SAGPS receiver 100 passes through the tunnel 108 or the urban canyon 116, the SAGPS receiver 100 experiences an unmitigated outage event or an unmitigated degradation event. However, having experienced the outage event or the degradation event, the SAGPS receiver 100 records various information about the event. The recorded information include a position fix prior to the start of the event (referred to herein as a start threshold position fix), a position fix following the end of the event (referred to herein as an end threshold position fix) in an embodiment. In other embodiments, the recorded information also include one or more of the heading, speed, altitude of the SAGPS receiver 100, and/or the number of SVs 104 observed, at each of the threshold position fixes. Thereafter, when the SAGPS receiver 100 passes through the tunnel 108 or the urban canyon 116, the SAGPS receiver 100 refers to the previously recorded information to mitigate the degradation event.

FIGS. 4A-4E illustrate some of the scenarios that the SAGPS receiver 100 could encounter. In FIG. 4A, the SAGPS receiver 100 passes through a curved tunnel 120. The SAGPS receiver 100 records data at a start threshold position 122 and at an end threshold position 124. In addition to the position of the GPS receiver at each of the threshold positions 122, 124, the recorded data indicate the heading of the SAGPS receiver 100 as it entered the tunnel 120 and as it exited the tunnel 120. From the recorded information, the SAGPS receiver 100 determines an approximate path of the tunnel 120 (i.e., an approximate path from the start threshold position fix to the end threshold position fix). Similarly, in FIG. 4B the SAGPS receiver 100 passes through a straight tunnel 126. The SAGPS receiver 100 records data at a start threshold position 128 and at an end threshold position 130, or if traveling in the opposite direction, records data at start threshold position 132 and at an end threshold position 134.

Of course, the approximated path of the SAGPS receiver 100 through a particular tunnel, such as through the curved tunnel 120, could be inaccurate if approximated using only the position and heading of the SAGPS receiver 100 at the start and end threshold positions 122, 124. FIG. 4C illustrates a winding tunnel 136. The SAGPS receiver 100 records fixes for the start and end threshold positions 138 and 140, respectively, of the winding tunnel 136, which have the same headings as the start and end threshold positions 122 and 124, respectively, of the curved tunnel 120. Without additional information, the SAGPS receiver 100 might approximate the path between the start threshold position 138 and the end threshold position 140 as similar to the path of the curved tunnel 120. However, in the scenario depicted in FIG. 4C, the SAGPS receiver 100 implements a GPS+DR system. Accordingly, the SAGPS receiver 100 is operable to record DR information about estimated positions and/or headings within the winding tunnel 136. FIG. 4C depicts four points 142, each point 142 representing a recorded, estimated position and/or heading of the SAGPS receiver 100 at a point in the winding tunnel 136. The SAGPS receiver 100 uses the points 142 to more accurately approximate the path of the SAGPS receiver 100 through the winding tunnel 136.

In FIGS. 4D and 4E the SAGPS receiver 100 passes through an urban canyon 144 (FIG. 4D) or 146 (FIG. 4E). The urban canyons 144, 146 cause degradation events. The SAGPS receiver 100 records information at start threshold positions 148, 150, and at end threshold positions 152, 154. Because the SAGPS receiver 100 experiences a degradation event, and not an outage event, the SAGPS receiver 100 may record and use additional position information determined during the degradation event, such as an estimated position at a point 156 or 158.

Figure 5:
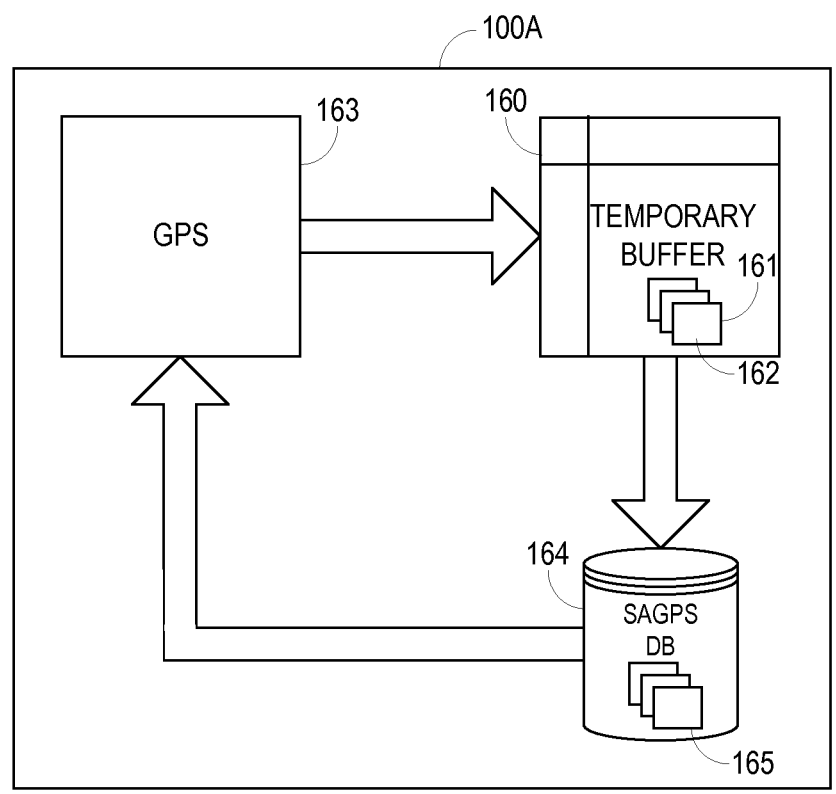
FIG. 5 is a block diagram of an SAGPS receiver in accordance with an embodiment.

FIG. 5 is a block diagram of an example SAGPS receiver 100A according to an embodiment. The SAGPS receiver 100A operates by storing in a temporary buffer 160 records 161 containing data and meta-data 162 provided by a GPS block 163. By way of example, the GPS data include position data (e.g., latitude and longitude), velocity data (e.g., heading and speed), and altitude, while exemplary meta-data include the number of SVs observed, the carrier to noise ratio (CN0), information about the relative geometry of the observed SVs, dilution of precision (DOP) data, and the type of positioning system (e.g., GPS, AGPS, DGPS, GPS+DR). The temporary buffer 160 is optimally sized to accommodate temporary storage of the GPS data and meta-data 162 for a period longer than the longest expected degradation event. For example, in some embodiments, the temporary buffer 160 stores GPS data and meta-data 162 for a 30-minute period. Thus, if the SAGPS receiver 100A calculates five position fixes per second, the temporary buffer 160 stores 9000 records 161 (i.e., a record for each of five position fixes per second, for 1800 seconds), each containing GPS data and meta-data 162 for one of 9000 position fixes.

The SAGPS receiver 100A periodically scans the temporary buffer 160 to look for outage and/or degradation events. Upon determining a degradation event, the SAGPS receiver 100A identifies the records 161 in the temporary buffer 160 corresponding to the start and end of the event, and stores one or more records 165 for each of the start and end of the event in an SAGPS database 164. These records 165 contain data for position fixes obtained immediately prior to the start of the event (the start threshold position fix) and immediately subsequent to the end of the event (the end threshold position fix). In some embodiments, the SAGPS receiver 100A additionally stores a topographical relationship between the start and end threshold positions. Each of the records 165 in the SAGPS database 164 (and, for that matter, each of the records 161 in the temporary buffer 160) includes, in various embodiments, combinations of one or more of the following data: time tag, latitude, longitude, altitude, heading, speed, # of observed SVs, HDOP, VDOP, Minimum SV elevation, minimum carrier-to-noise ratio, next point ID, last point ID, the type of positioning system, local temperature, local air pressure, and local direction of the magnetic fields, etc.

Having recorded in the SAGPS database 164 data for the fixes at the start and end threshold positions (collectively, a threshold pair), the SAGPS receiver 100A thereafter compares the most recent position fix to records 165 in the SAGPS database 164, to determine if an event is going to occur or, if an event is occurring, to determine if it is a known event. The SAGPS receiver 100A retrieves the records 165 for the threshold pair and determines the topological relationship between the current position fix and the threshold positions. The SAGPS receiver 100A uses the data in the SAGPS database 164 to mitigate the event by, for example, using the approximated path between the start and end threshold positions to augment the accuracy of position fixes during a degradation event, or to replace missing position fixes during an outage event. In some embodiments, the SAGPS receiver 100A also (or alternatively) uses the data in the SAGPS database 164 to facilitate reacquisition of the GPS signals 102 at the end of the event.

Figure 6A:
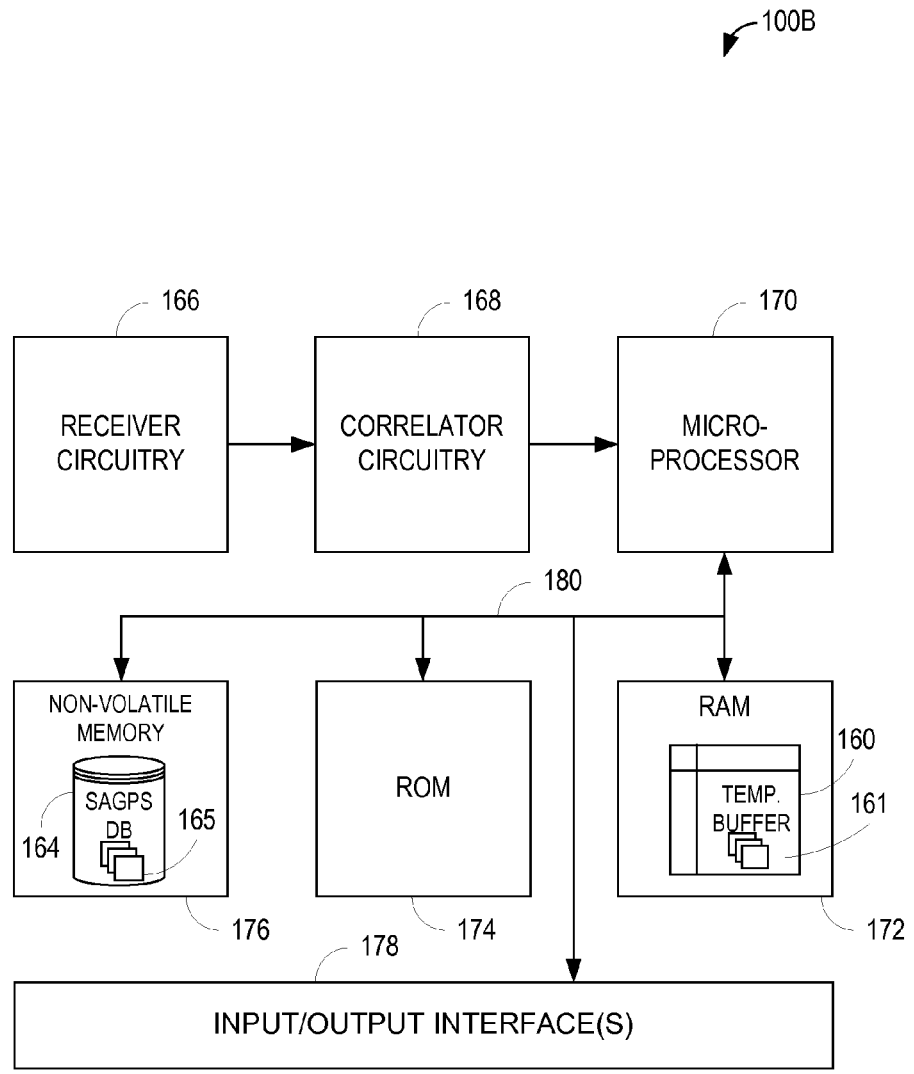
FIG. 6A is a block diagram of an SAGPS receiver in accordance with the embodiment.

FIG. 6A is a block diagram of another SAGPS receiver 100B according to an embodiment. The SAGPS receiver 100B includes receiver circuitry 166 for demodulating the GPS signals 102 received from the GPS SVs 104. The receiver circuitry 166 includes amplification circuits, frequency mixers, oscillators, filters, demodulators, A/D circuits, and the like, as generally understood by those of skill in the art. In various embodiments, the receiver circuitry 166 is assembled from discrete components (which may be integrated circuits) for performing various functions of the receiver circuitry 166. In other embodiments, the receiver circuitry 166 is implemented on an integrated circuit.

The receiver circuitry 166 is communicatively coupled to correlator circuitry 168 that, also as generally understood by those of skill in the art, performs a correlation function on the demodulated signals. In various embodiments, the correlator circuitry 168 is implemented as one or more digital signal processing cores. In other embodiments, the correlator circuitry 168 is implemented by one or more general purpose processor cores. In still other embodiments, the correlator circuitry 168 is implemented in a field programmable gate array (FPGA) or an application specific integrated circuit (ASIC).

The correlator circuitry 166 is, in turn, communicatively coupled to a microprocessor 170. The microprocessor 170 is responsible for the numeric computation involved in determining a position fix from the GPS signals 102 received from the SVs 104. The microprocessor 170 also implements the SAGPS functionality of the SAGPS receiver 100, storing, retrieving, and evaluating information related to outage and degradation events.

The information related to outage and degradation events is stored, temporarily, as the records 161 in the temporary buffer 160, and threshold position records 165 are eventually stored in the SAGPS database 164. In the embodiment depicted in FIG. 6A, the temporary buffer 160 is stored in a random access memory (RAM) 172, while the SAGPS database 164 is stored in a non-volatile memory 176. A read only memory (ROM) 174 stores computer executable instructions for operation of the SAGPS receiver 100B. The processor 170 executes machine readable instructions stored in the ROM 174 and/or another memory. An input/output (I/O) circuit 178 provides an interface to other components, such as a display or a host processor (not shown). A bus 180 communicatively connects the microprocessor 170, the RAM 172, the ROM 174, the non-volatile memory 176, and the I/O circuit 178.

Figure 6B:
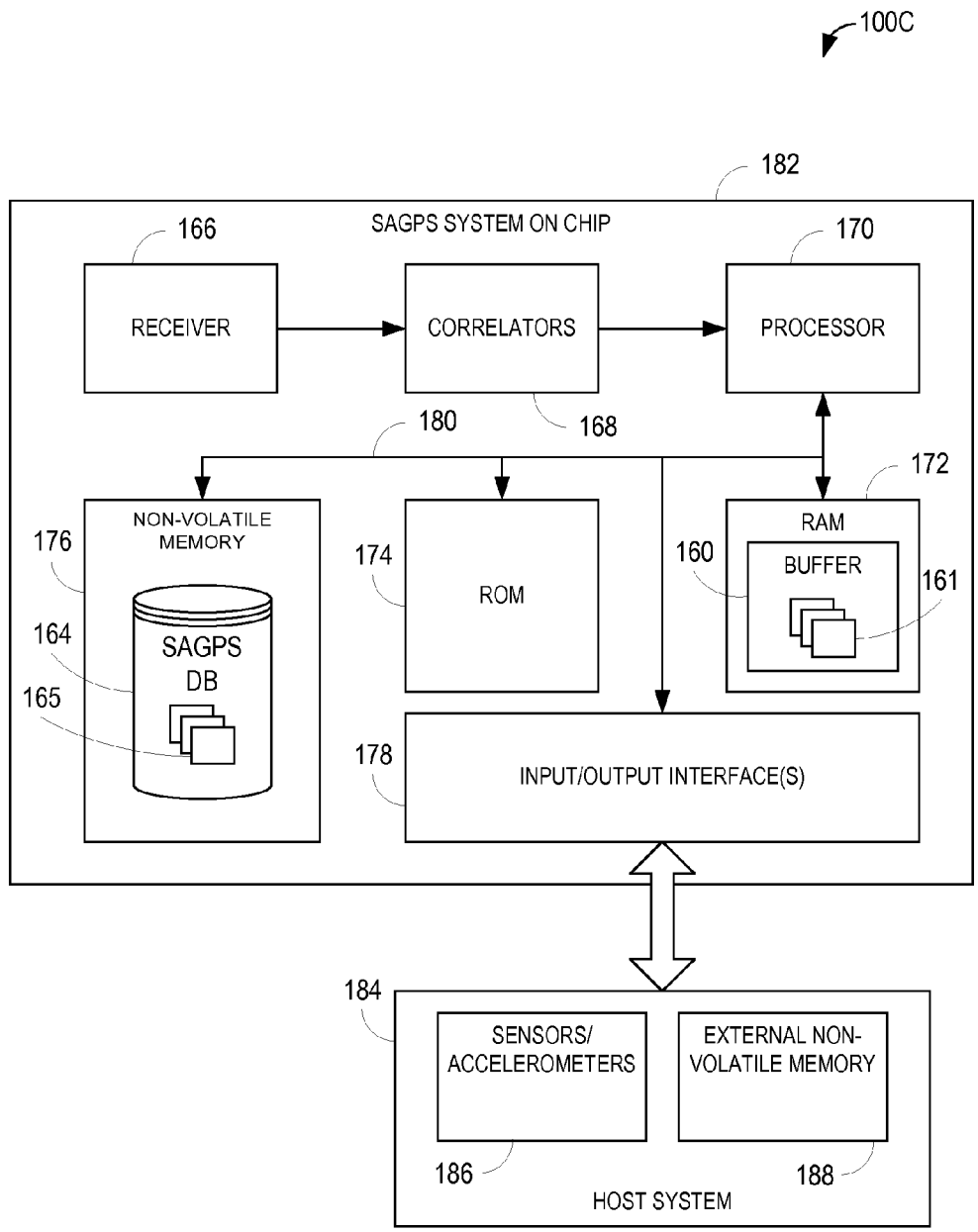
FIG. 6B is a block diagram of another embodiment of an SAGPS receiver.

FIG. 6B is a block diagram of another example SAGPS receiver 100C according to another embodiment. In the embodiment of FIG. 6B, the SAGPS receiver 100C includes an SAGPS integrated circuit implemented as a system on a chip (SAGPS IC) 182. That is, each of the receiver circuitry 166, the correlators 168, the processor 170, the RAM 172 (including the temporary buffer 160), the ROM 174, the non-volatile memory 176 (including the SAGPS database 164), the I/O interface 178, and the bus 180 is implemented on a single, unitary IC). The I/O interface 178 allows the SAGPS IC 182 to communicate with a host system 184. In FIG. 6B, the host system 184 includes, among other things, sensors/accelerometers 186 (e.g., for implementing GPS+DR) and external non-volatile memory 188. In some embodiments, the host system is a mobile device such as a mobile GPS unit, a mobile telephone, a smart phone, a personal digital assistant (PDA), a portable media player (PMP), etc.

Figure 6C:
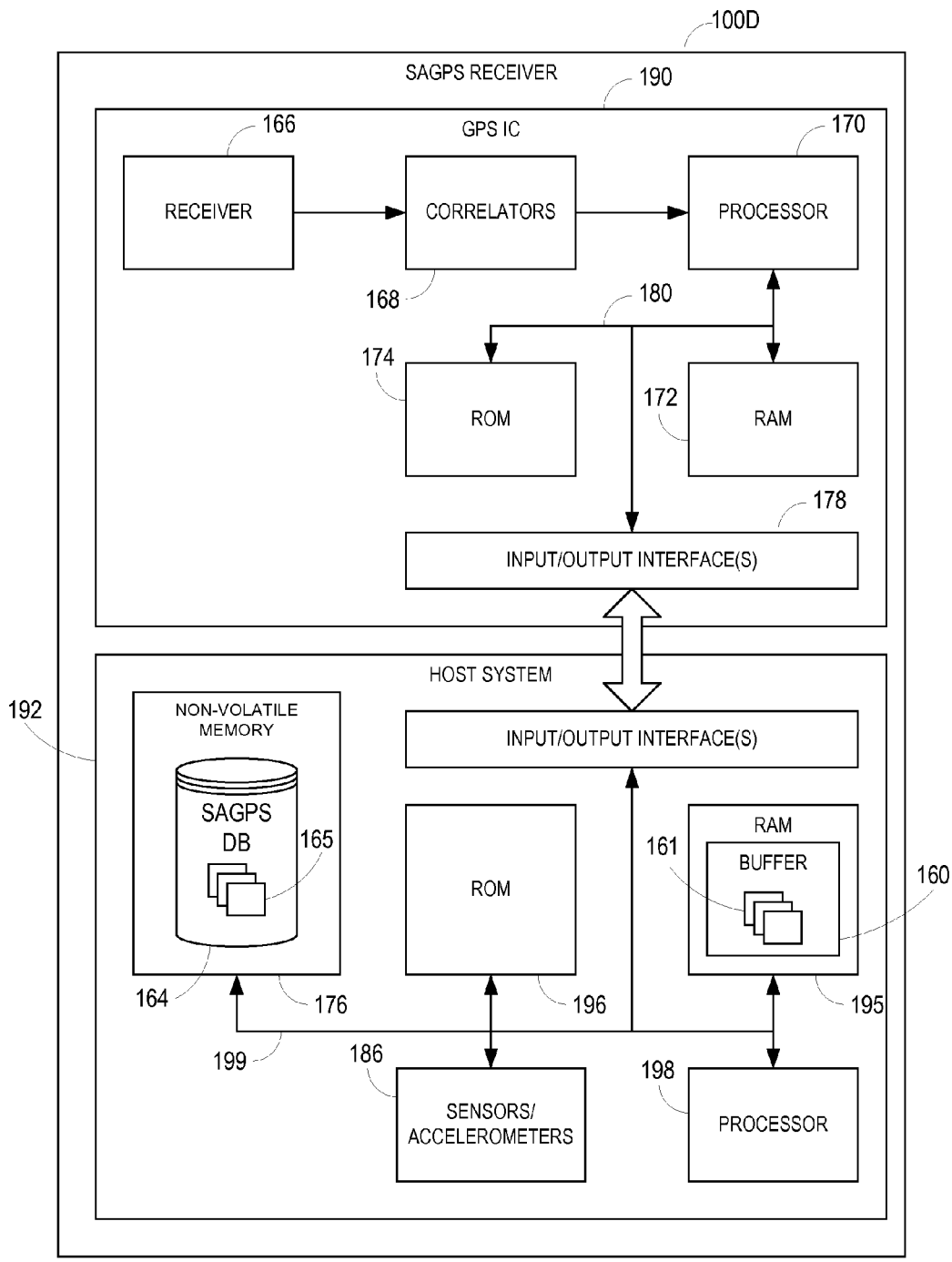
FIG. 6C is a block diagram of yet another embodiment of an SAGPS receiver.

FIG. 6C is a block diagram of still another example SAGPS receiver 100D according to an embodiment. In the embodiment of FIG. 6C, the SAGPS receiver 100D implements stand-alone GPS functionality using a GPS IC 190. Like the SAGPS IC 182, the GPS IC 190 includes the receiver circuitry 166, the correlators 168, the processor 170, the RAM 172 (including the temporary buffer 160), the ROM 174, and the I/O interfaces 178. In contrast to the SAGPS IC 182, however, the RAM 172 in the GPS IC 190 does not include the buffer 160, and omits the non-volatile memory 176 (and the SAGPS database 164).

Instead, the SAGPS receiver 100D depicted block diagram form in FIG. 6C communicatively couples the GPS IC 190 with a host system 192 through the I/O interface 178 and a compatible I/O interface 194 included in the host system 192. The host system 192 includes a RAM 195, on which the temporary buffer 160 is stored, and the non-volatile memory 176, on which the SAGPS database 164 is stored. The host system 192 also includes a ROM 196, a processor 198, and the sensors/accelerometers 186. The various components of the host system 194 are connected by a bus 199.

In other embodiments not illustrated but similar to either of the embodiments depicted in FIGS. 6A-6C, both the temporary buffer 160 and the SAGPS database 164 are stored in the non-volatile memory 176.

Also, in various embodiments, either of the microprocessor cores 170, 198 is a digital signal processor core. In various other embodiments, either of the microprocessor cores 170, 198 is two or more general purpose processor cores. In still other embodiments, either of the microprocessor cores 170, 198 is implemented in a field programmable gate array (FPGA) or an application specific integrated circuit (ASIC).

Figure 7A:
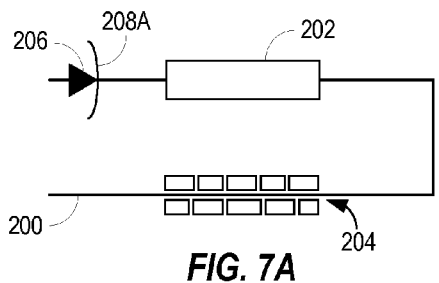
FIGS. 7A through 7N illustrate operation of an SAGPS receiver in accordance with an embodiment.
Figure 7B:
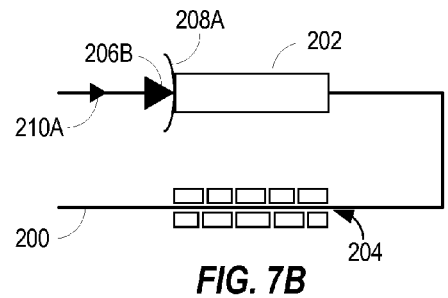
Figure 7C:
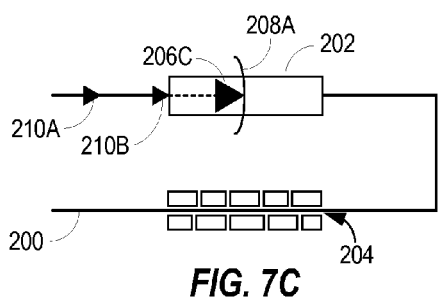
Figure 7D:
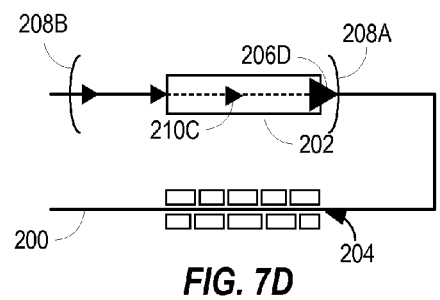
Figure 7E:
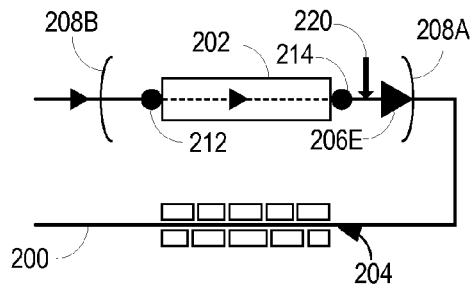
Figure 7F:
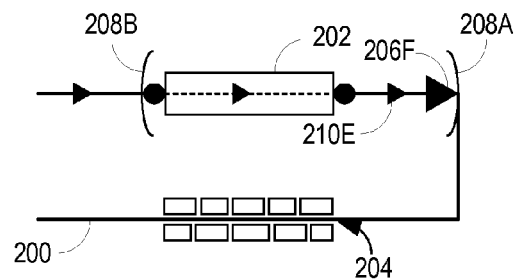
Figure 7G:
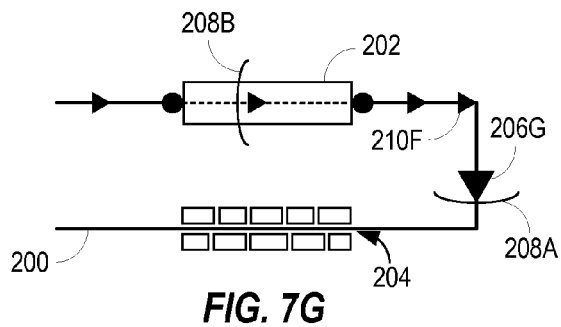
Figure 7H:
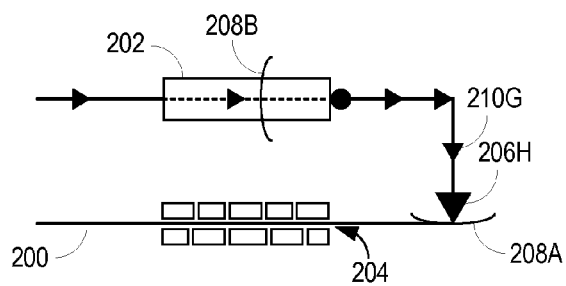
Figure 7I:
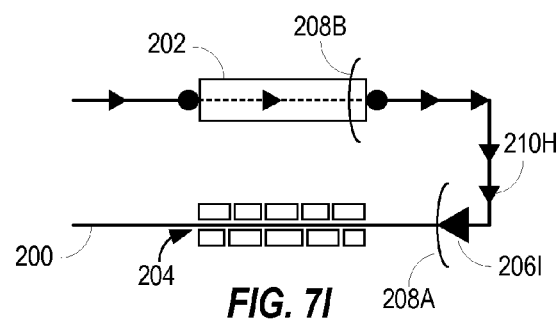
Figure 7J:
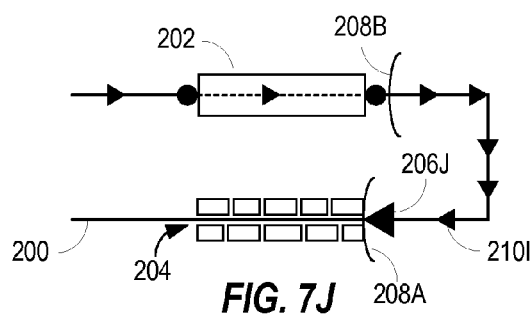
Figure 7K:
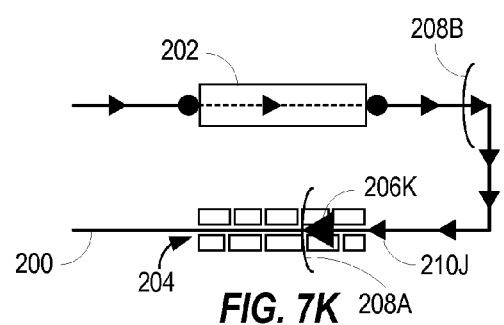
Figure 7L:
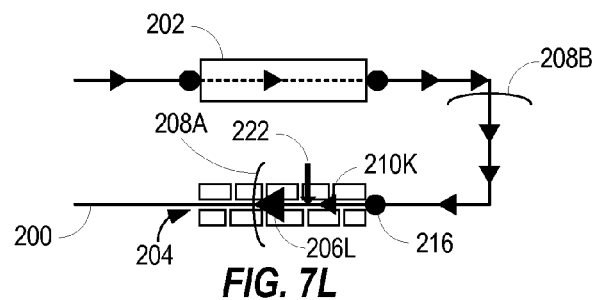
Figure 7M:
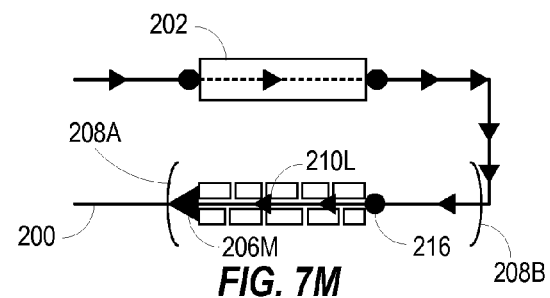
Figure 7N:
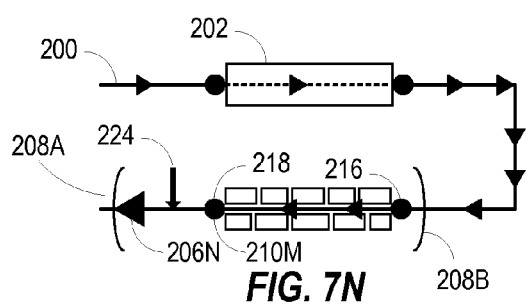

FIGS. 7A through 7N illustrate the operation of the SAGPS receiver 100 as it moves along a path 200 through an outage event 202 (represented as a tunnel) and a degradation event 204 (represented as an urban canyon). In each of the FIGS. 7A through 7N, a large triangle represents the current position fix 206 of the SAGPS receiver 100. In each figure, the current position fix is labeled as 206x, where x is corresponds to the FIG. 7x (i.e., point 206B indicates the current position in FIG. 7B, point 206C indicates the current position in FIG. 7C, etc.). A right bracket 208A, always at the current position fix 206, indicates the most recent position stored in the temporary buffer 160. A similar left bracket 208B (see FIGS. 7D through 7N) represents the oldest position stored in the temporary buffer 160. In FIGS. 7B through 7N, smaller triangles 210x represent previous position fixes, where x corresponds to the FIG. 7x in which the point was current (i.e., in FIGS. 7C through 7N, the point 206B of FIG. 7B is represented as 210B; in FIGS. 7D through 7N, the point 206C of FIG. 7B is represented as 210C; etc.). Circles 212-218 indicate start threshold positions (212, 216) and end threshold positions (214, 218) stored in the SAGPS database 164.

In FIG. 7A, the SAGPS receiver 100 determines the current position fix 206A and records it in the temporary buffer 160. The SAGPS receiver 100 has not yet encountered a degradation event.

In FIG. 7B, the SAGPS receiver 100 records in the temporary buffer 160 a second position fix 206B at the threshold of the outage event represented by the tunnel 202.

In FIG. 7C, the SAGPS receiver 100 records a current position fix 206C in the temporary buffer 160. While the SAGPS receiver 100 has entered the tunnel 202 (and is experiencing an outage event), the SAGPS receiver 100 has not scanned the temporary buffer 160 since the start of the outage event. Thus, despite having entered the tunnel 202, the temporary buffer record 161 corresponding to the point 210B has not yet been recorded as a begin threshold position.

A current position fix 206D in FIG. 7D is recorded in the temporary buffer 160 at the exit of the tunnel 202, as the SAGPS receiver 100 exits the outage event. At that point, the temporary buffer 160 captures the period between the right bracket 208A and the left bracket 208B. The SAGPS receiver 100 still has not scanned the temporary buffer 160 since the start of the outage event, and the temporary buffer points 210B and 210C still have not been recorded, respectively, as the begin and end threshold positions.

FIG. 7E depicts a point 206E at which SAGPS receiver 100 records a second position fix outside of the tunnel 202. An arrow 220 represents the point in time at which the SAGPS receiver 100 scanned the temporary buffer 160. Thus, having recognized the outage event that occurred in the tunnel 202, the SAGPS receiver 100 has recorded in the SAGPS database 164 the start threshold position 212 and the end threshold position 214.

FIGS. 7F through 7I illustrate the progression of the buffer contents and the current position fix as the SAGPS receiver 100 continues to move along the path 200 between the end of the tunnel 202 and the beginning of the urban canyon 204. Note that in FIGS. 7G, 7H, and 7I, the oldest record 161 in the temporary buffer 160 records a position fix after the start threshold position 212, and within the tunnel 202.

In FIG. 7J, the SAGPS receiver 100 determines a position fix 206J, just before entering the urban canyon 204 and just before experiencing the accompanying degradation event. The SAGPS receiver 100 records the position fix 206J in a corresponding record 161 in the temporary buffer 160.

A position fix 206K inside the urban canyon 204 is depicted in FIG. 7K. The position fix 206K suffers from the degradation event caused by the urban canyon 204. The SAGPS receiver 100 has not scanned the buffer 160 since the degradation event began, however, so the SAGPS receiver 100 has not yet recorded the begin threshold point (which will correspond to the position fix 210J).

An arrow 222 in FIG. 7L indicates the point in time at which the SAGPS receiver 100 again scanned the temporary buffer 160. At the time depicted in FIG. 7L, the SAGPS receiver 100 has fixed and recorded two position fixes 210K and 206L within the in the urban canyon 204, the first position fix 210K before the SAGPS receiver 100 scanned the temporary buffer 160 and the second position fix 206L after the SAGPS receiver 100 scanned the temporary buffer 160. Thus, having recognized the degradation event is occurring in the urban canyon 204, the SAGPS receiver 100 has identified the start threshold position 216. Because the SAGPS receiver 100 has not yet identified an end threshold position for the degradation event, neither the start threshold position 216 or an end threshold position have been recorded in the SAGPS database 164.

In the FIG. 7M, the SAGPS receiver 100 has recorded a current position fix 206M after exiting the urban canyon 204. However, the SAGPS receiver 100 has not yet scanned the temporary buffer 160 since exiting the urban canyon 204 and, therefore, has not identified the end of the degradation event.

An arrow 224 in FIG. 7N indicates the point in time at which the SAGPS receiver 100 has again scanned the temporary buffer 160. At the time depicted in FIG. 7N, the SAGPS receiver 100 has fixed and recorded the position 210M after exiting the degradation event caused by the urban canyon 204. Having recognized the end of the degradation event, the SAGPS receiver 100 has identified the end threshold position 218. The start and end threshold events 216 and 218 are recorded as a threshold pair in the SAGPS database 164.

Figure 8:
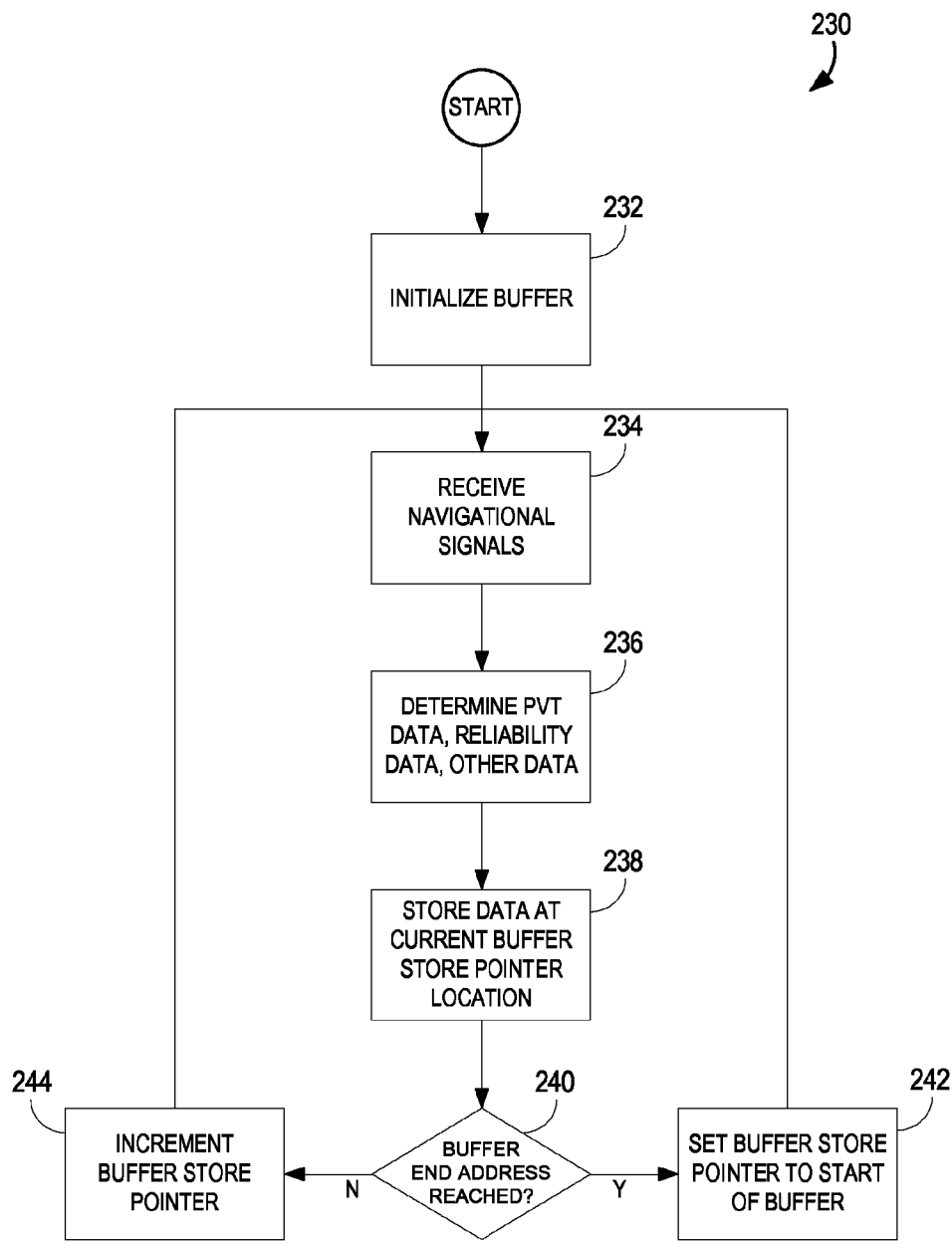
FIG. 8 is a flow diagram of a method for storing position data in a temporary buffer according to an embodiment.

Particular embodiments of methods by which the SAGPS receiver 100 records, evaluates, and utilizes data will now be described with reference to FIGS. 8 through 14. The temporary buffer 160 in the described embodiments is a circular buffer. That is, the temporary buffer 160 cycles through the allocated memory space in the RAM 172, such that data in the oldest record 161 is supplanted by the newest data once the buffer has initially reached its capacity. Other embodiments may utilize other buffer structures without requiring undue experimentation or significant modification to the methods and apparatus described herein. FIG. 8 is a flow diagram of a method 230 for buffering data in the temporary buffer 160 in the RAM 172. First, instructions executed by the processor 170 cause the processor 170 to initialize in the RAM 172 the temporary buffer 160 (block 232) by, for example, allocating a buffer memory space (in the RAM 172) having a start address and an end address, and setting a "store" pointer location. Once the temporary buffer 160 is initialized, the receiver circuitry 166 and correlator circuitry 168 begin to receive and correlate GPS signals 102 from the GPS SVs 104 (block 234). Using the output of the correlator circuitry 168, the processor 170 determines position, velocity, and time (PVT) data (e.g., latitude and longitude data, heading data, velocity data, altitude data, etc.), reliability data (e.g., DOP data, number of observed SVs, carrier to noise ratio (CN0)), and other data (e.g., the type of positioning system implemented) (block 236) and stores the data in the RAM 172 at the current store pointer location (block 238).

After the processor 170 records the data in the temporary buffer 160 at the current buffer store location, the processor 170 evaluates whether the current buffer store pointer location is the same as the end address of the allocated buffer memory space (block 240). If the current buffer store pointer location is the same as the end address of the allocated buffer memory space, the processor 170 resets the current store pointer to the start address of the buffer memory space (block 242). Otherwise, the processor 170 increments the current store pointer to the next address in the buffer memory space (block 244). In either event, the method 230 returns to receiving GPS signals 102 (block 234), and the method 230 is repeated.

Figure 9:
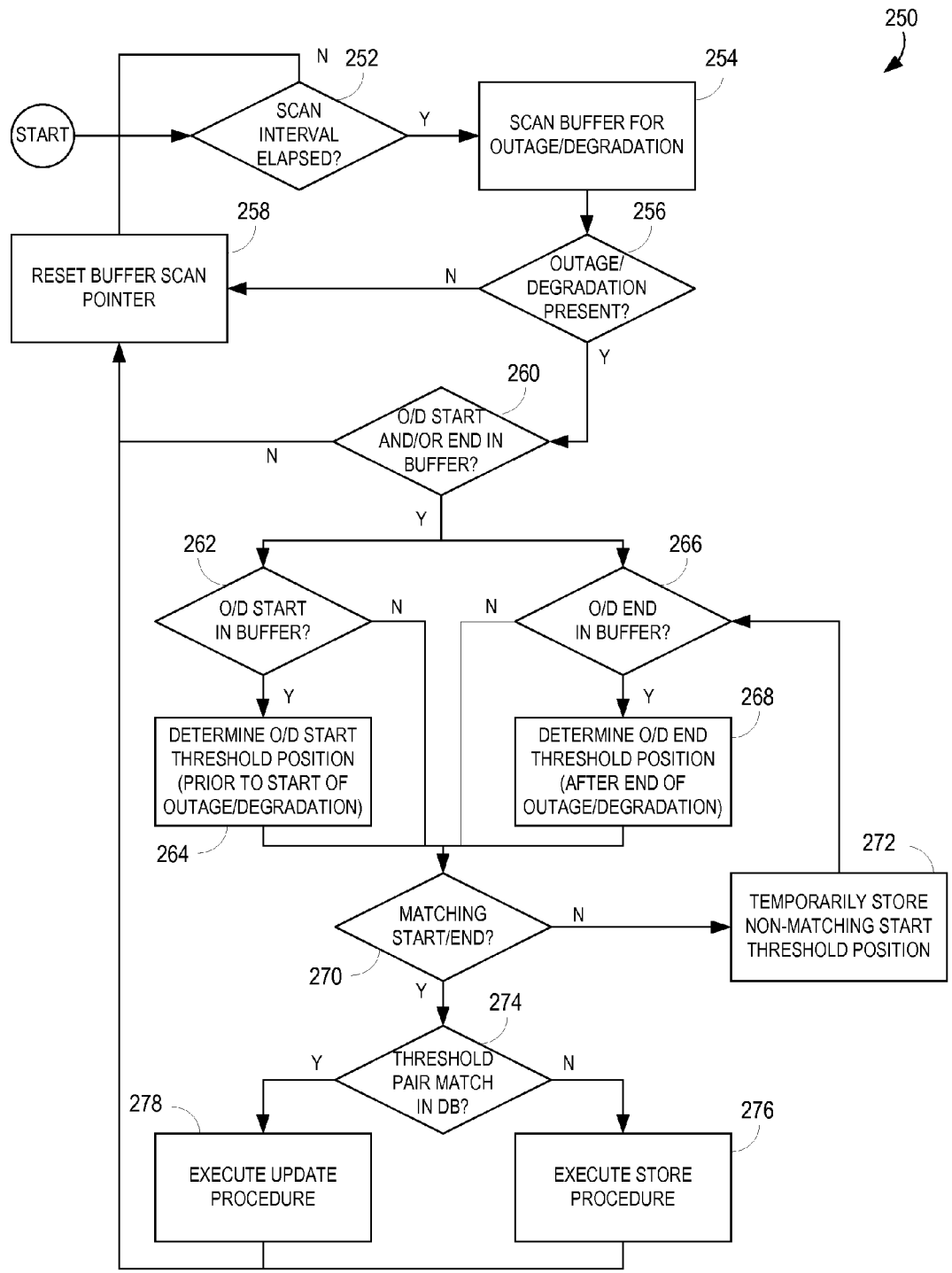
FIG. 9 is a flow diagram of a method for storing threshold data in an SAGPS database according to an embodiment.

According to an embodiment, while storing data in the temporary buffer 160 according to the method 230 (see FIG. 8), the processor 170 also executes a method 250, depicted in FIG. 9, for storing threshold data in the SAGPS database 164. The processor 170 scans the records 161 of the temporary buffer 160 periodically, comparing a time variable to a predetermined scan interval until the scan interval elapses. When the processor 170 determines that the scan interval has elapsed (block 252), the processor 170 executes a scan of the temporary buffer 160 for records 161 recording any degradation events (block 254). If no records 161 in the temporary buffer 160 indicate the presence of a degradation event (block 256), the processor 170 sets a buffer scan pointer to the location of the most recent record 161 in the temporary buffer 160 (block 258) so that the processor 170 does not, after the scan interval has elapsed again, re-scan the records just scanned. On the other hand, if the processor 170 detects a degradation event in the temporary buffer 160, the processor 170 proceeds to determine whether the scanned records 161 include a start and/or end of the event (block 260).

During some scans (e.g., the scan at the time indicated by the arrow 220 in FIG. 7E) the processor 170 may find both the start and the end of a degradation event in the records 161 of the temporary buffer 160. During other scans, the processor 170 may find only a start of a degradation event (as in the scan at the time indicated by arrow 222 in FIG. 7L), or only the end of a degradation event (as in the scan at the time indicated by arrow 224 in FIG. 7N). During still other scans, the temporary buffer 160 may not contain any records 161 indicating a degradation event or, alternatively, may find that all of the records 161 indicate a degradation event and that no start or end of the event is present in the temporary buffer 160.

If the processor 170 determines that the start of a degradation event is indicated by the records 161 scanned in the buffer 160 (block 262), the processor 170 identifies a start threshold position for the outage or degradation event (block 264). As described above, the start threshold position would correspond to a valid position fix preceding the start of the outage or degradation event. Similarly, if the processor 170 determines that the end of a degradation event is indicated by the records 161 scanned in the buffer 160 (block 266), the processor 170 identifies an end threshold position for the outage or degradation event (block 268). If the processor 170 identifies a start threshold position for a degradation event, but has not yet identified an end threshold position for the outage or degradation event (block 270) (e.g., if the SAGPS receiver 100 is still experiencing the outage or degradation event when the processor 170 scans the temporary buffer 160), the processor 170 temporarily stores the identified start threshold position (block 272) until a corresponding end threshold position is identified for the outage or degradation event. If, instead, the processor 170 has identified both the start and end threshold positions of the outage or degradation event (e.g., if the outage or degradation event both started and ended between the last time the processor 170 scanned the temporary buffer 160 and the current scan of the temporary buffer 160), the processor 170 determines whether the SAGPS database 164 contains a matching pair of records 165 indicating the same or similar threshold positions (i.e., if the region corresponding to the outage or degradation event is known) (block 274), and, if no matching pair of records 165 is found, the processor 170 executes a store procedure (block 276). Otherwise, the processor 170 executes an update procedure (block 278).

Figure 10:
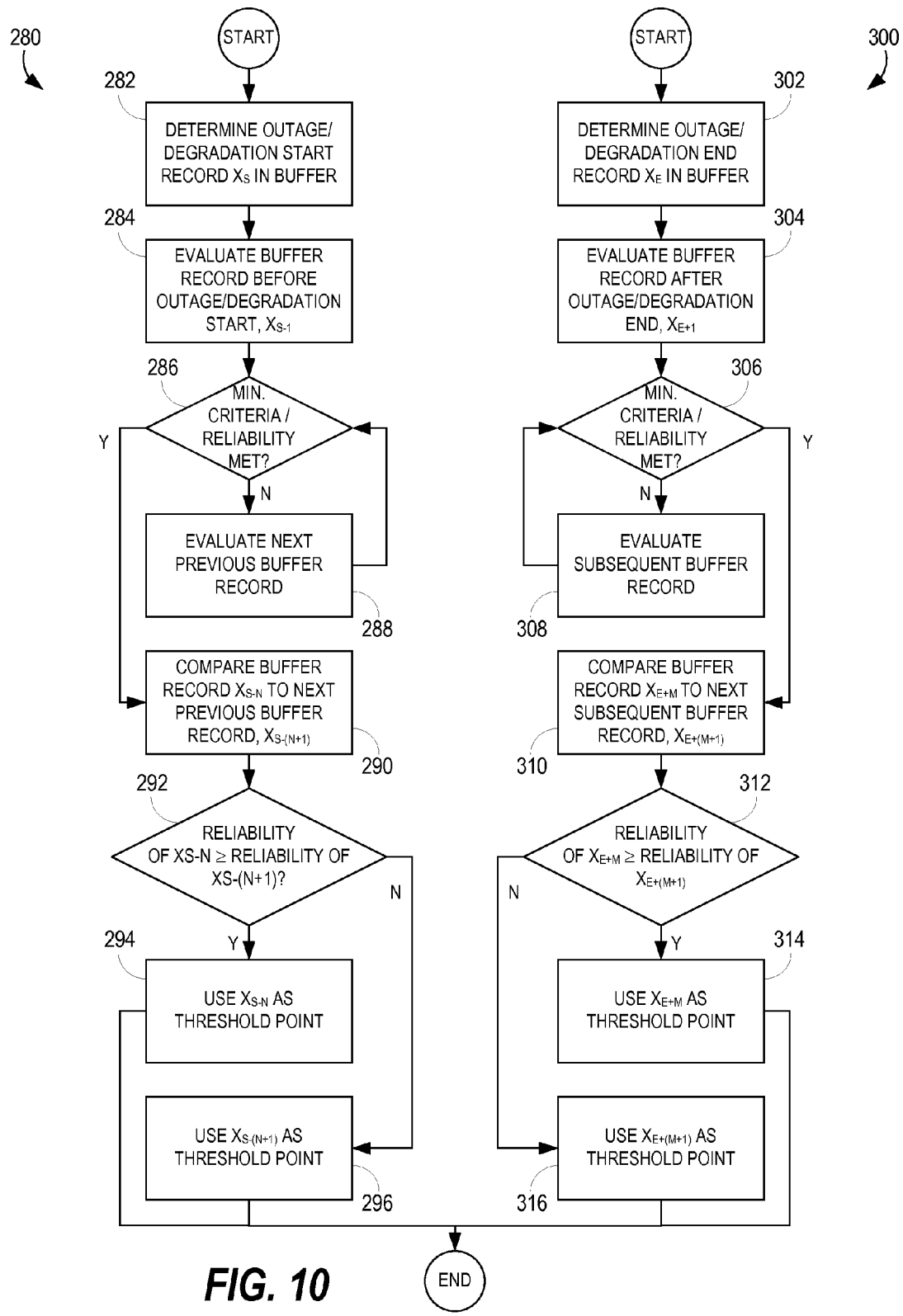
FIG. 10 includes flow diagrams of methods for determining threshold data for an outage or degradation event according to an embodiment.

FIG. 10 is a flow diagram of example methods 280 and 300 for determining the start and end threshold positions, respectively, of a degradation event (FIG. 9, blocks 264, 268) according to an embodiment. The processor 170 executes the method 280 if a scan of the temporary buffer 160 indicates the start of a degradation event is present in the temporary buffer 160 (FIG. 9, block 262). The processor 170 determines the record 161 ($X_S$) in the temporary buffer 160 that corresponds to the start of the outage or degradation event (block 282). Having determined the record $X_S$, the processor 170 evaluates the buffer record 161 preceding the buffer record $X_S$, $X_{S-1}$ (block 284). The processor 170 evaluates the buffer record $X_{S-1}$ to determine whether the record $X_{S-1}$ indicates that the data contained therein meet predetermined criteria and/or reliability measures (block 286). If the position fix in the record $X_{S-1}$ does not meet the predetermined criteria and/or reliability measures, the processor 170 evaluates the next previous buffer record (block 288), $X_{S-2}$. This continues for N records, until the processor 170 finds a record, $X_{S-N}$, in which the position fix meets the required criteria and/or reliability measures.

Once the processor 170 has found a record $X_{S-N}$ that contains a position fix meeting the minimum criteria and/or reliability measures, the processor 170 compares the record $X_{S-N}$ to the next previous record $X_{S-(N+1)}$ (block 290), and evaluates whether the reliability of the position fix contained in the record $X_{S-N}$ is the same as or better than the reliability of the position fix contained in the record $X_{S-(N+1)}$ (block 292). In the depicted embodiment, evaluating the reliability of the position fixes in the records $X_{S-N}$ and $X_{S-(N+1)}$ at the block 292 includes evaluating the number of SVs observed for each position fix. However, in other embodiments, other reliability measures (e.g. DOP, CN0, etc.) may be evaluated, individually or collectively, at the block 292. If the reliability of the position fix in record $X_{S-N}$ is the same as or better than the reliability of the position fix in record $X_{S-(N+1)}$, the processor 170 uses the position fix of record $X_{S-N}$ as the start threshold position (block 294). Otherwise, if the reliability of the record $X_{S-N}$ is less than the reliability of the record $X_{S-(N+1)}$, the processor 170 uses the position fix of record $X_{S-(N+1)}$ as the start threshold position (block 296).

Referring still to FIG. 10, the method 300 for determining the end threshold position is similar in many respects to the method 280 for determining the start threshold position. The processor 170 executes the method 300 if a scan of the temporary buffer 160 indicates the end of a degradation event is present in the temporary buffer 160 (FIG. 9, block 266). The processor 170 determines the record 161 ($X_E$) in the temporary buffer 160 that corresponds to the start of the outage or degradation event (block 302). Having determined the record $X_E$, the processor 170 evaluates the buffer record 161 subsequent to the buffer record $X_E$, $X_{E+1}$ (block 304). The processor 170 evaluates the buffer record $X_{E+1}$ to determine whether the record $X_{E+1}$ indicates that the position fix contained therein meets predetermined criteria and/or reliability measures (block 306). If the position fix in the record $X_{E+1}$ does not meet the predetermined criteria and/or reliability measures, the processor 170 evaluates the next subsequent buffer record (block 308), $X_{E+2}$. This continues for M records, until the SAGPS receiver 100 finds a record, $X_{E+M}$, having a position fix that meets the required criteria and/or reliability measures.

Once the processor 170 has found a record $X_{E+M}$ having a position fix meeting the minimum criteria and/or reliability measures, the processor 170 compares the record $X_{E+M}$ to the next subsequent record $X_{E+(M+1)}$ (block 310), and evaluates whether the reliability of the position fix in the record $X_{E+M}$ is the same as or better than the reliability of the position fix in the record $X_{E+(M+1)}$ (block 312). In the depicted embodiment, evaluating the reliability of the position fixes in the records $X_{E+M}$ and $X_{E+(M+1)}$ at the block 312 includes evaluating the number of SVs observed (i.e., received by the receiver circuitry 166) for each position fix. However, in other embodiments, the processor 170 may evaluate other reliability measures (e.g. DOP, CN0, etc.), individually or collectively, at the block 312. If the reliability of the position fix in the record $X_{E+M}$ is the same as or better than the reliability of the position fix in the record $X_{E+(M+1)}$, the processor 170 uses the position fix of record $X_{E+M}$ as the start threshold position (block 314). Otherwise, if the reliability of the position fix in the record $X_{E+M}$ is less than the reliability of the position fix in the record $X_{E+(M+1)}$, the processor 170 uses the position fix of record $X_{E+(M+1)}$ as the start threshold position (block 316).

Figure 11:
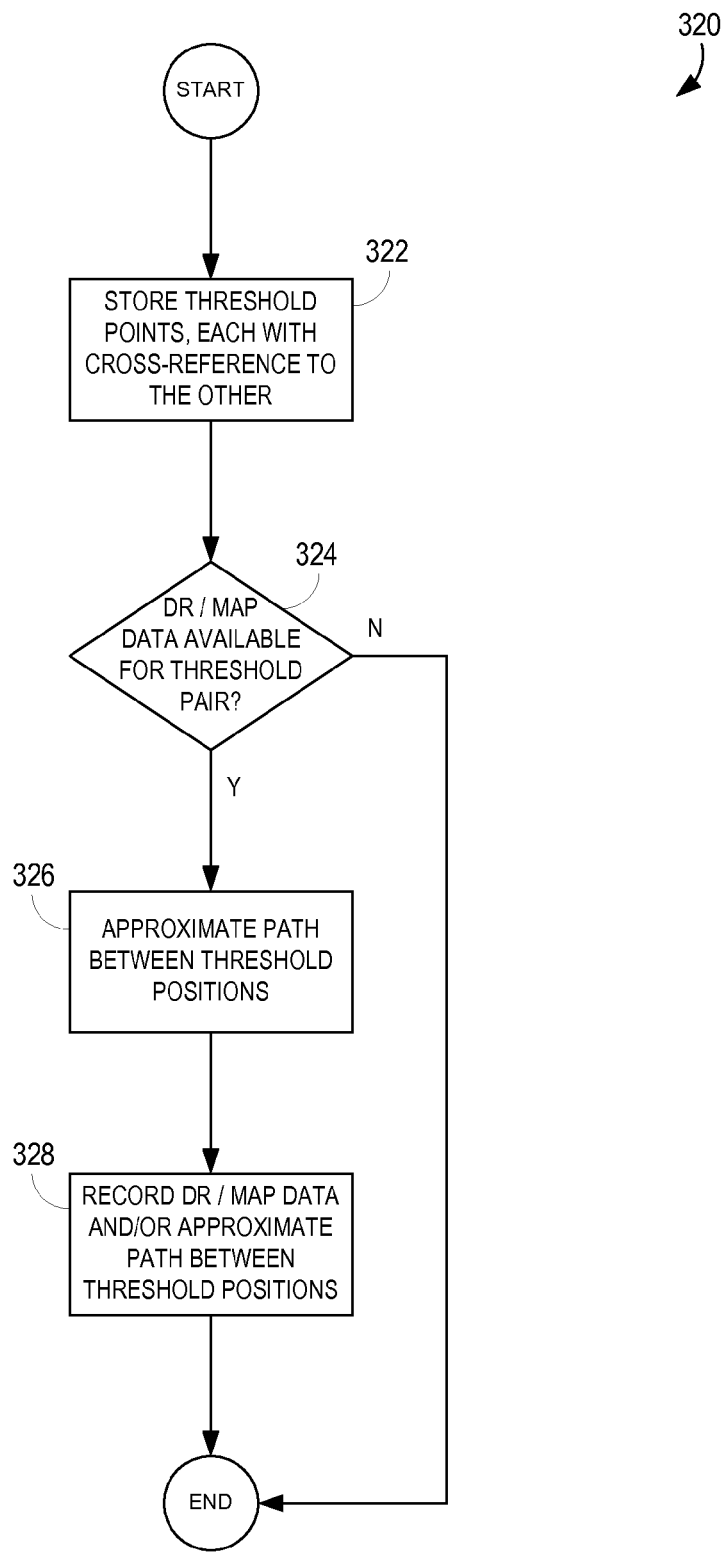
FIG. 11 is a flow diagram of a method for implementing a procedure to store threshold data determined according to an embodiment.

After the processor 170 has identified both the start and end threshold positions of the outage or degradation event (block 270) and determined that the SAGPS database 164 does not contain a matching pair (block 274) of records 165, the processor 170 executes a store procedure. FIG. 11 is a flow diagram of an example method 320 for implementing the store procedure according to an embodiment. The processor 170 stores the start and end threshold positions as records 165 in the SAGPS database 164, each with a cross-reference to the other or, in any event, each such that the other can easily be determined (e.g., by storing the records in the database in related memory locations) (block 322). In the depicted embodiment, the processor 170 determines whether there is DR or map data available for the start and end threshold pair (block 324). If DR or map data is available, the processor 170 uses the available data to approximate the path between the start and end threshold positions (block 326). The processor 170 also records in the SAGPS database 164 the DR and/or map data and/or the approximate path between the start and end threshold positions (block 328). If no DR or map data is available, the method 320 ends. In other embodiments, the processor 170 calculates an approximate path even in the absence of DR and/or map data, and records the approximate path in the SAGPS database 164.

Figure 12:
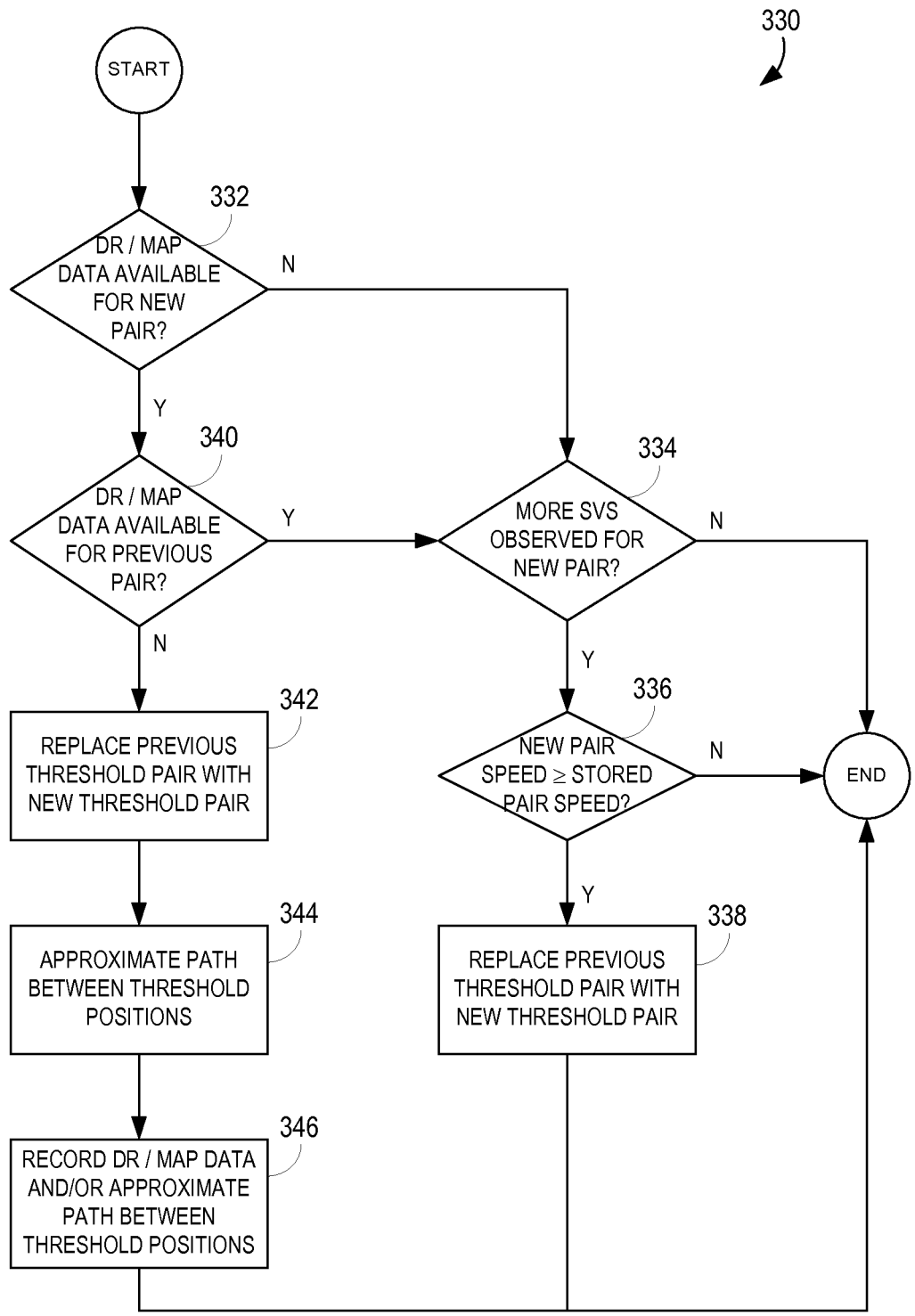
FIG. 12 is a flow diagram of a method for implementing a procedure to update threshold data according to an embodiment.

If the processor 170 has identified both the start and end threshold positions of the outage or degradation event (block 270) and, instead, determines that the SAGPS database 164 contains a matching pair (block 27) of records 165, the processor 170 executes an update procedure. FIG. 12 is a flow diagram of an example method 330 for implementing the update procedure according to an embodiment. The method 330 begins by checking whether the new start and end threshold pair (determined by the methods 280, 300) includes DR and/or map data (block 332). If DR and/or map data are not available for the new start and end threshold pair, the processor 170 determines whether the new start and end threshold pair indicate that the start and end threshold position fixes recorded therein were the result of more observed SVs than the previously recorded start and end threshold pair (block 334). In the event that the determination is negative (i.e., that the previously recorded start and end threshold pair resulted from more observed SVs than the new start and end threshold pair), the method 330 ends. Otherwise, if the determination is positive, the processor 170 evaluates whether the new start and end threshold pair indicate that the start and end threshold position fixes recorded therein were recorded while the SAGPS receiver 100 was traveling at a velocity greater than or equal to the velocity of the SAGPS receiver 100 at the time at which the previously recorded start and end threshold pair (block 334) were recorded (block 336). If not, the method 330 ends. If so, the processor 170 replaces the previous threshold pair with the new threshold pair (block 338).

If DR and/or map data are available for the new start and end threshold pair (block 332), the processor 170 determines whether DR and/or map data were also available for the previously recorded start and end threshold pair (block 340). If so, execution of the method continues as described above relative to blocks 334-338. If DR and/or map data were not available for the previously recorded start and end threshold pair (block 340), the processor 170 replaces in the records 165 the previous start and end threshold pair with the new start and end threshold pair (block 342). The processor 170 also approximates the path between the new start and end threshold positions (block 344) and records in the SAGPS database 164 the DR and/or map data and/or the approximated path between the start and end threshold positions (block 346).

Figure 13:
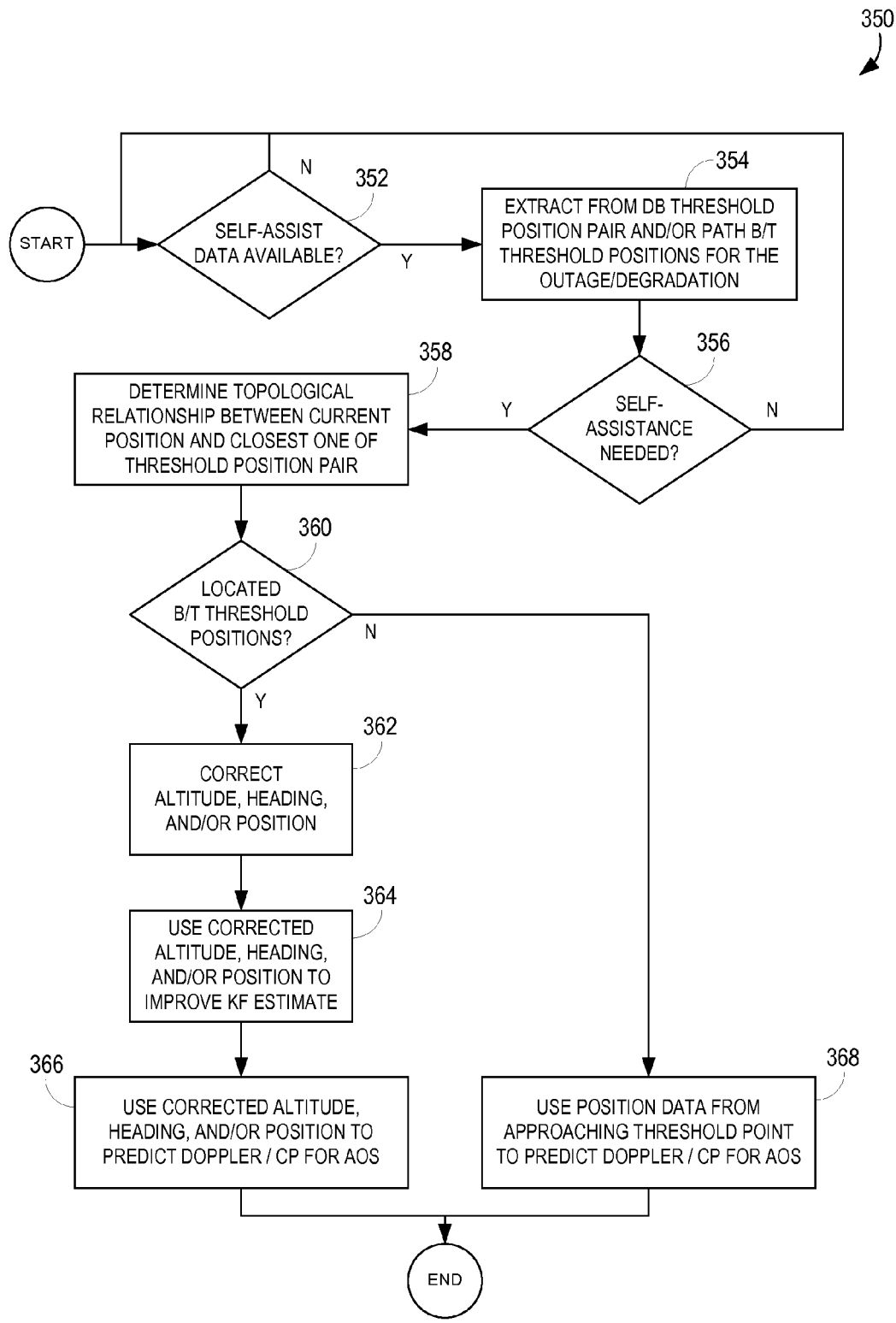
FIG. 13 is a flow diagram of a method for implementing self-assistance using an SAGPS receiver in accordance with embodiment.

Once one or more pairs of start and end threshold positions are stored in the SAGPS database 164, the processor 170 uses the information to aid in future position fixes during known outage or degradation events. FIG. 13 is a flow diagram of an example method 350 for executing a self-assistance procedure according to an embodiment. As the processor 170 determines position fixes, the processor 170 determines whether self-assist data are available for a desired location (block 352). In some embodiments, the processor 170 makes this evaluation with each position fix while in other embodiments, the processor 170 makes this evaluation periodically. In some embodiments, the desired location is the location indicated by the most recent position fix, while in others, the desired location is an area within a predetermined distance (e.g., within three miles) of the SAGPS receiver 100 or within a predetermined range (e.g., within one minute's travel of the SAGPS receiver's 100 current position, considering the SAGPS receiver's 100 current and/or predicted heading and velocity). In additional embodiments, the desired location may be within a predetermined distance of any point along a predicted route.

In some embodiments, a progressive or multi-level search of the SAGPS database 164 is implemented to determine whether SAGPS data for the desired location (however defined) are available. In some embodiments, the SAGPS receiver 100 searches first whether SAGPS data exist for a broad geographical region (e.g., Northern California). If SAGPS data for the broad geographical region do not exist in the SAGPS database 160, the processor 170 does not search further levels. On the other hand, if SAGPS data for the broad geographical region do exist in the SAGPS database 160, the processor 170 may search an additional level such as, by way of example and not limitation, a relatively local region within 1 degree latitude and 1 degree longitude of the most recent position fix. Similarly, if SAGPS data for the local region are present in the SAGPS database 160, the processor 170 may search for SAGPS data in a still narrower region (e.g., SAGPS data for positions within 30 degrees of the present heading and within five miles, SAGPS data for positions within a given distance or range along a predetermined route, etc.).

In any event, if self-assist data are not available for the desired location (block 352), the processor 170 will re-evaluate the determination at a later period. If, however, self-assist data are available for the desired location, the processor 170 extracts the relevant start and end threshold position pair, and the approximated path between the start and end threshold positions, from the SAGPS database 164 (block 354). With each position fix or, alternatively, at periodic intervals, the processor 170 evaluates whether self-assistance is needed (block 356). Generally, the processor 170 considers the reliability of one or more position fixes in determining whether self-assistance is needed. The determination is based on the number of SVs observed, the carrier to noise ratio, the signal to noise ratio, or a combination these factors, for the most recent position fix or fixes. For example, if high-quality, line-of-sight signals are received from four or more SVs, self-assistance is not needed. However, if signals 102 from fewer than four SVs are observed, if the carrier to noise ratio is too low on one or more of the signals 102, and/or if multipath effects degrade one or more of the signals 102, self-assistance may be implemented. The determination of whether self-assistance is needed may also rely on one or more assumptions. For example, in some embodiments, the SAGPS receiver 100 implementation assumes that likelihood of a change in heading is inversely proportional to speed. That is, a vehicle traveling at a high velocity is unlikely to make sharp turns. In some embodiments, the SAGPS receiver 100 implementation assumes that velocity will not change drastically over a short period of time, for example, that a vehicle traveling 60 MPH between two reliable, consecutive position fixes, will not, on the subsequent position fix one second later, have traveled 176 feet (i.e., will not suddenly be traveling 120 MPH). In this manner, the SAGPS receiver 100 can implement heuristic judgment about the reliability of a given position fix and the need for self-assistance.

If self-assistance is not needed, the processor 170 continues to evaluate whether self-assistance data are available (block 352) and the method 350 continues as described.

Alternatively, if self-assistance is needed, the processor 170 determines the topological relationship between the most recent position fix and the positions indicated by the extracted start and end threshold position pair (block 358). If the most recent position fix indicates that the SAGPS receiver 100 is not located in a region defined based on the extracted start and end threshold positions (block 360), the processor 170 uses the data in the extracted records 165 to predict Doppler and code phase information and, optimally, to facilitate faster reacquisition of the GPS signals 102 (block 368).

If instead the most recent position fix indicates that the SAGPS receiver 100 is currently located in a region defined based on the extracted start and end threshold positions (block 360), the processor 170 uses the data in the extracted records 165 to correct altitude, heading, and/or position data during the outage or degradation event (block 362). The processor 170 also, in some embodiments, uses the corrected altitude, heading, and/or position to improve the Kalman filter estimate. In additional embodiments, the processor 170, additionally or alternatively, uses the corrected altitude, heading, and/or position to predict Doppler and code phase and, optimally, to facilitate faster reacquisition of the GPS signals 102 (block 366).

Figure 14:
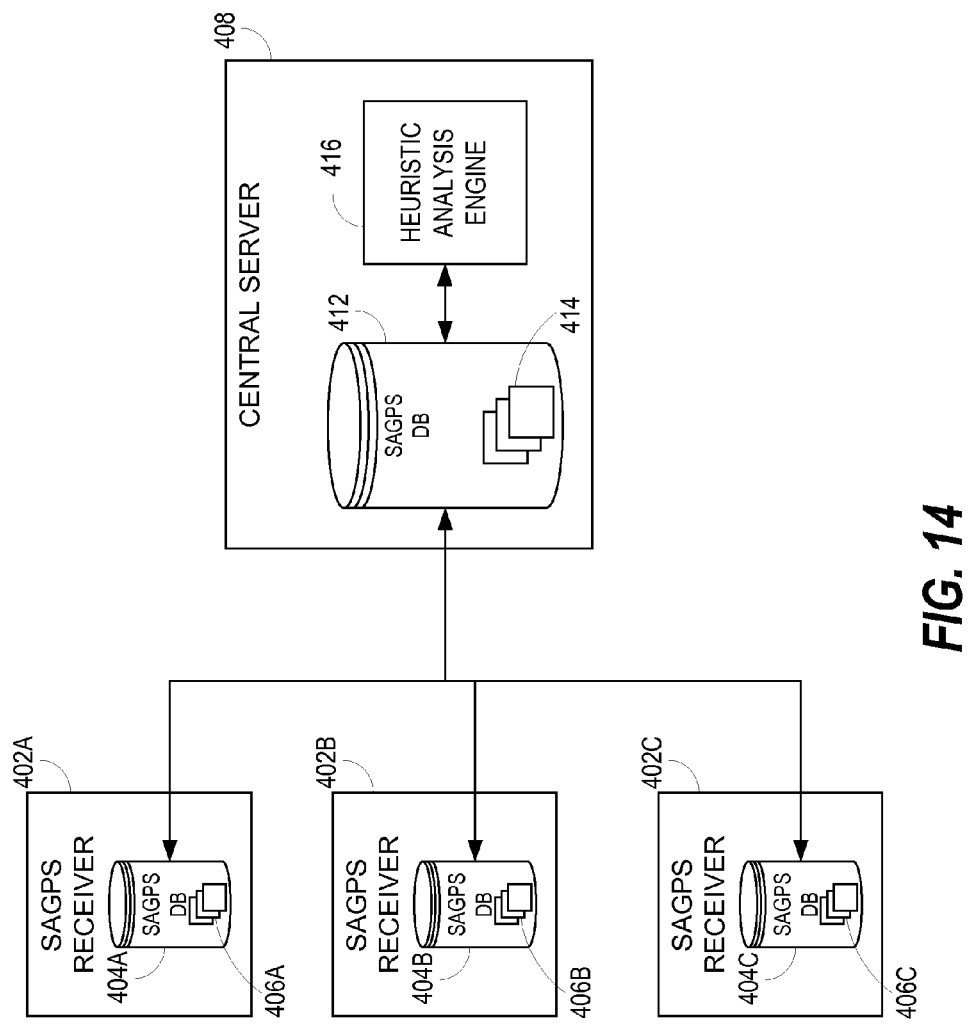
FIG. 14 is a block diagram of a network for sharing SAGPS data between SAGPS devices in accordance with an embodiment.

While each SAGPS receiver 100 contains a local SAGPS database 164, in some embodiments individual SAGPS receivers 100 operate to share SAGPS data with each other directly or through a server. FIG. 14 is a block diagram of a network 400 of SAGPS receivers 402A-402C according to an embodiment. Each of the SAGPS receivers 402A-402C includes a local database 404A-404C that, in turn, stores SAGPS records 406A-406C for the respective SAGPS receiver 402, as described with respect to the embodiments above. In the embodiment depicted in FIG. 14, the SAGPS receivers 402A-402C are communicatively coupled to a central server 408 by a connection 410. In some embodiments, connection 410 is a temporary connection established between the SAGPS receiver 402 and the central server 408 via, for example, a universal serial bus (USB) interface selectively connected to a PC that is, in turn, connected to the Internet. In other various embodiments, the SAGPS receiver 402 communicates with the central server 408 via a wireless connection with a PC that is, in turn, connected to the Internet. In still other various embodiments, the SAGPS receiver 402 is operable to connect directly to the central server 410 through the Internet, either wirelessly (e.g., using a wireless connection to the Internet via a wireless access point, a mobile telephony base station, etc.) or via a cable, without an intervening PC.

In any event, through the connection 410, each of the SAGPS receivers 402A-402C uploads and downloads SAGPS data to/from a master SAGPS database 412 on the central server 408. The SAGPS database 412 stores master records 414 of SAGPS data uploaded from each of the SAGPS receivers 402. In this manner, the master SAGPS database 412 maintains high quality and up-to-date SAGPS data and collects SAGPS data from multiple SAGPS receivers 402 spread over multiple geographical areas.

In the embodiment depicted in FIG. 14, the central server 408 also includes a heuristic analysis engine 416, communicatively coupled to the SAGPS database 412, that analyzes data received from the SAGPS receivers 402 and data stored in the master SAGPS database 412. The heuristic analysis engine 416 examines and assimilates incoming SAGPS data, progressively refining data according to its analysis. In some embodiments, the central server maintains more than one SAGPS database 412, or more than one position pair for any given location, and the heuristic analysis engine 416 operates using data from multiple or all of them.

The SAPGS receivers 402 are also operative to download data from the central server 408 to the local SAGPS databases 404 through the connection 410. In this manner, though each SAGPS receiver 402 contains a local SAGPS database 404, each SAGPS receiver participates in the collection and refinement of SAGPS data and can access the most refined and up-to-date data. In some embodiments, each local SAGPS database 404 contains the entire SAGPS database 412, which stores information received from the SAGPS receivers 402. In other embodiments, each SAGPS receiver 402 stores only data for a selected geographical region. In still other embodiments, each SAGPS receiver 402 is operative to selectively or automatically download information for a new region as necessary.

Additionally, in some embodiments the data in the SAGPS databases 404 and/or 412 have no expiration date. That is, data need only be updated if there are changes in road conditions that cause or mitigate outage or degradation events, or if more reliable data are available. In one embodiment, the heuristic analysis engine 416 is implemented, at least partially, by a processor executing machine readable instructions. In another embodiment, the heuristic analysis engine 416 is implemented, at least partially, using hardware.

The presently described methods and apparatus provide a variety of advantageous effects including, for example, improving trajectory accuracy, improving trajectory availability, improving time to reacquisition of signals, and mitigating multi-path interference. Moreover, the presently described methods and apparatus accomplish these advantageous effects without requiring changes to existing GPS infrastructure. The methods described can be self-contained within the device. Wide scale implementation is low-cost (due to the self-contained nature of the data and, in networked embodiments such as the embodiment of FIG. 14, the distributed nature of the data collection), and implementation in any given SAGPS receiver only minimally increases processing load. Further, while the described methods can be implemented in the absence of other assisting technologies such as AGPS, DGPS, GPS+DR, etc., the described methods can also be implemented as complementary to other assisting technologies and can be implemented in multi-function receivers.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

The disclosure herein contemplates the following aspects:

1. A method of implementing a navigation system, the method comprising:
   implementing a buffer configured to store a buffer record for each of a plurality of position fixes determined by a positioning system receiver;
   implementing a database configured to store a database record for each of a plurality of threshold positions;
   receiving zero or more positioning signals from a plurality of navigational satellites;
   accumulating in a buffer a plurality of buffer records, each buffer record for a corresponding one of the plurality of position fixes determined by the positioning system receiver;
   identifying a first threshold position near an area in which a degradation event occurs;
   recording the first threshold position in a first database record of the database;
   identifying a second threshold position near the area, the second threshold position indicated by one of the plurality of position fixes outside of the area, and proximate to a position at which the degradation event ends; and
   recording the second threshold position in a second database record of the database, the second database record stored in a memory location determinable from the first database record, the first database record stored in a memory location determinable from the second database record.

2. The method of aspect 1, further comprising:
   periodically scanning the buffer; and
   identifying in the buffer a set of consecutively accumulated buffer records corresponding to the area, each of the set of buffer records indicating a position fix for which one or more of the positioning signals received by the positioning system receiver is degraded,
   wherein identifying the first threshold position includes locating a buffer record temporally preceding an earliest-recorded buffer record in the identified set; and
   wherein identifying the second threshold position includes locating a buffer record temporally following the latest-recorded buffer record in the identified set.

2A. The method of claim 2, wherein the first threshold position is indicated by a position fix in one of the plurality of buffer records outside of the set and proximate to a position at which the degradation event starts, and wherein the second threshold position is indicated by a position fix in a second of the plurality of buffer records outside of the set and proximate to a position at which the degradation event ends.

3. The method of aspect 1, further comprising:
determining that the positioning system receiver has entered an area of degraded signal reception;
identifying as the first threshold position, in response to the determination that the positioning system receiver has entered the area of degraded signal reception, a buffer record recorded before the positioning system receiver entered the area of degraded signal reception;
determining that the positioning system receiver has exited the area of degraded signal reception; and
identifying as the second threshold position, in response to the determination that the positioning system receiver has exited area of degraded signal reception, a buffer record recorded after the positioning system receiver exited the area of degraded signal reception.

4. The method of any of the preceding aspects, further comprising:
determining whether the database includes a database record corresponding to a position fix within a predetermined range of a current position fix of the positioning system receiver;
if it is determined that the database includes a database record corresponding to a position fix within a predetermined range of the current position fix of the positioning system receiver, extracting from the database a pair of threshold positions corresponding to the position fix within the predetermined range of the current position fix of the positioning system receiver; and
determining a relationship between the current position fix of the positioning system receiver and the extracted threshold positions.

The method of aspect 4, further comprising:
if the current position is within a region defined based on the threshold positions, performing one or more of the following:
interpolating a current altitude of the positioning system receiver based on altitudes recorded in the database records corresponding to the extracted threshold positions;
approximating a current heading of the positioning system receiver based on headings of the receiver recorded in the database records corresponding to the extracted threshold positions;
approximating a position of the positioning system receiver based at least on the headings of the positioning system receiver recorded in the database records corresponding to the extracted threshold positions; and
approximating a position of the positioning system receiver based at least on a map associated with a region surrounding and including the extracted threshold positions.

6. The method of aspect 4, further comprising: if the current position is within a region defined based on the threshold positions, using data contained in the database record of threshold position closest to the current position to facilitate re-acquisition of one or more signals from which the positioning system receiver position is determined.

7. The method of aspect 4, further comprising: if the current position is not within a region defined based on the threshold positions, using an altitude of the closest threshold position as a constraint for a next update of a Kalman Filter.

8. The method of any of the preceding aspects, further comprising: replacing the database records associated with the first and second threshold positions with updated database records for the first and second threshold positions when the buffer records for positioning system receiver position fixes corresponding to the first and second threshold positions contain data calculated from a larger plurality of navigational satellites than the database records for the first and second threshold positions.

9. The method of any of the preceding aspects, wherein the relationship between the first database record and the second database record is a topographical relationship.

10. The method of any of the preceding aspects, wherein the area of interest is an area of degraded signal reception.

11. The method of any of the preceding aspects, wherein the area of interest is an area of no signal reception.

12. The method of any of the preceding aspects, wherein identifying at least one of the first and second threshold positions comprises determining a reliability of position fix data contained in a plurality of buffer records.

13. The method of any of the preceding aspects, further comprising:
receiving sensor data from one or more sensors, each sensor operative to measure one of speed, heading, or acceleration;
using the received sensor data to approximate one or more points or headings long a path between the first threshold position and the second threshold position; and
storing the approximated one or more points or headings.

14. A positioning system apparatus comprising:
a positioning system receiver;
a processor communicatively coupled to the positioning system receiver;
a memory buffer communicatively coupled to the processor;
a database communicatively coupled to the processor; and
one or more routines executed by the processor and collectively operative to:
cause accumulation in the buffer of a plurality of buffer records, each buffer record for a corresponding one of a plurality of position fixes of the positioning system receiver;
identify a first threshold position near an area of degraded signal reception;
record the first threshold position in a first database record of the database;
identify a second threshold position near the area of degraded signal reception;
record the second threshold position in a second database record of the database, the second database record stored in a memory location determinable from the first database record, the first database record stored in a memory location determinable from the second database record.

15. The positioning system apparatus of aspect 14, wherein the one or more routines are further operative to:
scan the buffer; and
identify in the buffer a set of consecutively accumulated buffer records corresponding to the area of degraded signal reception, each of the set of buffer records indicating a position fix for which one or more of the positioning signals received by the positioning system receiver is degraded; and
wherein identifying the first threshold position includes locating a buffer record temporally preceding an earliest-recorded buffer record in the identified set; and
wherein identifying the second threshold position includes locating a buffer record temporally following the latest-recorded buffer record in the identified set.

16. The positioning system apparatus of aspect 14, wherein the one or more routines are further operative to:
determine that the positioning system receiver has entered an area of degraded signal reception;
identify as the first threshold position, in response to the determination that the positioning system receiver has entered an area of degraded signal reception, a buffer record recorded before the positioning system receiver entered the area of degraded signal reception;

determine that the positioning system receiver has exited the area of degraded signal reception; and identify as the second threshold position, in response to the determination that the positioning system receiver has exited area of degraded signal reception, a buffer record recorded after the positioning system receiver exited the area of degraded signal reception.

17. The positioning system apparatus of any of aspects 14 to 16, wherein the one or more routines are further operative to:

determine whether the database includes a database record corresponding to a position fix within a predetermined range of a current position fix of the positioning system receiver;

if it is determined that the database includes a database record corresponding to a position fix within a predetermined range of the current position fix of the positioning system receiver, extract from the database a pair of threshold positions corresponding to the position fix within the predetermined range of the current position fix of the positioning system receiver; and determine the relationship between the current position fix of the positioning system receiver and the extracted threshold positions.

18. The positioning system apparatus of aspect 17, wherein the one or more routines are further operative to:

if the current position fix is within a region defined based on the threshold positions, perform one or more of the following:

interpolate a current altitude of the positioning system receiver based on altitudes recorded in the database records corresponding to the extracted threshold positions;

approximate a current heading of the positioning system receiver based on headings of the positioning system receiver recorded in the database records corresponding to the extracted threshold positions;

approximate a position of the positioning system receiver based at least on the headings of the positioning system receiver recorded in the database records corresponding to the extracted threshold positions; and approximate a position of the positioning system receiver based at least on a map associated with a region surrounding and including the extracted threshold positions.

19. The positioning system apparatus of aspect 17, wherein the one or more routines are further operative to:

use data contained in the database record of a threshold position closest to the current position to facilitate re-acquisition of one or more signals from which the positioning system receiver position fix is determined if the current position fix is within a region defined based on the threshold positions.

20. The positioning system apparatus of aspect 17, wherein the one or more routines are further operative to use an altitude of the closest threshold position as a constraint for a next update of a Kalman Filter if the current position fix is not within a region defined based on the threshold positions.

21. The positioning system apparatus of any of aspects 14 to 20, wherein the one or more routines are further operative to: replace the database records associated with the first and second threshold positions with updated database records for the first and second threshold positions when the buffer records for positioning system receiver positions corresponding to the first and second threshold position fixes contain data calculated from a larger plurality of navigational satellites than the database records for the first and second threshold positions.

22. The positioning system apparatus of any of aspects 14 to 21, wherein the relationship between the first database record and the second database record is a topographical relationship.

23. The positioning system apparatus of any of aspects 14 to 22, wherein the area of interest is an area of degraded signal reception.

24. The positioning system apparatus of any of aspects 14 to 23, wherein the area of interest is an area of no signal reception.

25. The positioning system apparatus of any of aspects 14 to 24, wherein identifying at least one of the first and second threshold positions comprises determining a reliability of the position fix contained in a plurality of buffer records.

26. The positioning system apparatus of any of aspects 14 to 25, further comprising one or more sensors, each sensor communicatively coupled to the processor and operative to measure one of speed, heading, or acceleration, and wherein the data received from the sensors are used to approximate one or more points or headings along a path between the first threshold position and the second threshold position.

27. A database stored on a computer-readable medium, the computer-readable medium communicatively coupled to a processor, the database comprising a plurality of record pairs, each record pair including a first threshold position record corresponding to a first positioning system receiver location and a second threshold position record corresponding to a second positioning system receiver location, each of the first and second threshold position records determinable upon knowledge of the other of the first and second threshold position records, the first and second positioning system receiver locations corresponding respectively to a position at which a positioning system receiver's location was determined prior to a degradation of a navigation signal and a position at which the positioning system receiver's location was determined subsequent to strengthening of the navigation signal.

28. The database of aspect 27, wherein the computer-readable medium is disposed in a device for satellite navigation.

29. The database of either aspect 27 or aspect 28, wherein the processor is communicatively coupled to a buffer and the positioning system receiver.

30. The database of aspect 27, wherein the computer-readable medium is disposed in a server selectively communicatively connected to one or more devices for satellite navigation.

31. A method of implementing a positioning system, the method comprising:

providing in a positioning system receiver a database having stored therein a plurality of records, the plurality of records including a plurality of record pairs, each record pair containing a first position fix in a first record of the record pair and a second position fix in a second record of the record pair, the first position fix indicating a position of the positioning system receiver prior to a signal degradation and the second position fix indicating a position of the positioning system receiver subsequent to a signal degradation; and calculating an estimated position for the positioning system receiver using as an input at least one of plurality of records pairs stored in the database.

32. The method of aspect 31, further comprising:
  determining whether the database includes a target record corresponding to a position fix within a predetermined range of a current position fix of the positioning system receiver;
  if it is determined that the database includes the target record, extracting from the database the record pair of which the target record is a part; and
  determining a relationship between the current position fix of the positioning system receiver and the first and second position fixes indicated by the extracted record pair.

33. The method of aspect 31, further comprising:
  determining that the positioning system receiver is experiencing a degradation event;
  locating a target record in the database corresponding to a current position fix of the positioning system receiver;
  extracting the record pair of which the target record is a part; and
  determining a relationship between the current position fix of the positioning system receiver and the first and second position fixes indicated by the extracted record pair.

34. The method of aspect 33, wherein locating a target record in the database corresponding to a current position fix of the positioning system receiver comprises locating a target record pair and defining an area, based on the position fixes indicated by the first and second records of the target record pair, in which the current position fix of the positioning system receiver is located.

35. The method of aspect 31, wherein calculating an estimated position for the positioning system receiver using as an input at least one of plurality of records pairs stored in the database comprises one or more of the following:
  interpolating a current altitude of the positioning system receiver based on altitudes recorded in the database records corresponding to the extracted threshold positions;
  approximating a current heading of the positioning system receiver based on headings of the receiver recorded in the database records corresponding to the extracted threshold positions;
  approximating a position of the positioning system receiver based at least on the headings of the positioning system receiver recorded in the database records corresponding to the extracted threshold positions; and
  approximating a position of the positioning system receiver based at least on a map associated with a region surrounding and including the extracted threshold positions.

36. A positioning system apparatus comprising:
  a positioning system receiver;
  a processor communicatively coupled to the positioning system receiver;
  a memory buffer communicatively coupled to the processor;
  a database communicatively coupled to the processor, the database storing a plurality of records, the plurality of records including a plurality of record pairs, each record pair containing a first position fix in a first record of the record pair and a second position fix in a second record of the record pair, the first position fix indicating a position of the positioning system receiver prior to a signal degradation and the second position fix indicating a position of the positioning system receiver subsequent to a signal degradation; and
  one or more routines executed by the processor and collectively operative to:
    calculate an estimated position for the positioning system receiver using as an input at least one of plurality of records pairs stored in the database.

37. The positioning system apparatus of aspect 36, wherein the one or more routines are further operable to:
  determine whether the database includes a target record corresponding to a position fix within a predetermined range of a current position fix of the positioning system receiver;
  if it is determined that the database includes the target record, extract from the database the record pair of which the target record is a part; and
  determine a relationship between the current position fix of the positioning system receiver and the first and second position fixes indicated by the extracted record pair.

38. The positioning system apparatus of aspect 36, wherein the one or more routines are further operable to:
  determine that the positioning system receiver is experiencing a degradation event;
  locate a target record in the database corresponding to a current position fix of the positioning system receiver;
  extract the record pair of which the target record is a part; and
  determine a relationship between the current position fix of the positioning system receiver and the first and second position fixes indicated by the extracted record pair.

39. The positioning system apparatus of aspect 36, wherein locating a target record in the database corresponding to a current position fix of the positioning system receiver comprises locating a target record pair and defining an area, based on the position fixes indicated by the first and second records of the target record pair, in which the current position fix of the positioning system receiver is located.

40. The positioning system apparatus of aspect 36, wherein calculating an estimated position for the positioning system receiver using as an input at least one of plurality of records pairs stored in the database comprises one or more of the following:
  interpolating a current altitude of the positioning system receiver based on altitudes recorded in the database records corresponding to the extracted threshold positions;
  approximating a current heading of the positioning system receiver based on headings of the receiver recorded in the database records corresponding to the extracted threshold positions;
  approximating a position of the positioning system receiver based at least on the headings of the positioning system receiver recorded in the database records corresponding to the extracted threshold positions; and
  approximating a position of the positioning system receiver based at least on a map associated with a region surrounding and including the extracted threshold positions.

41. The method of aspect 31, further comprising: using data stored in the database to facilitate re-acquisition of one or more signals from which the positioning system receiver position is determined.

42. The method of aspect 31, further comprising: using data stored in the database as a constraint for a next update of a Kalman Filter.

43. The method of either aspect 32 or aspect 33, wherein the relationship is a topographical relationship.

44. The positioning system apparatus of aspect 36, wherein the one or more routines are further operable to: use data stored in the database to facilitate re-acquisition of one or more signals from which the positioning system receiver position is determined.

45. The positioning system apparatus of aspect 36, wherein the one or more routines are further operable to: use data stored in the database as a constraint for a next update of a Kalman Filter.

46. The positioning system apparatus of either aspect 37 or aspect 38, wherein the relationship is a topographical relationship.

We claim:

1. A method, comprising:

receiving, at a positioning system receiver, respective navigation signals from a plurality of navigation system transmitters;

determining, at the positioning system receiver, a position fix of the positioning system receiver using the respective navigation signals;

storing, in a database of the positioning system receiver, a plurality of records, the plurality of records including a plurality of record pairs, each record pair indicating a respective geographic region subject to signal degradation of the navigation signals from the plurality of navigation system transmitters, wherein each record pair contains (i) a first position fix in a first record of the record pair and (ii) a second position fix in a second record of the record pair, wherein the first position fix indicates a position of the positioning system receiver determined prior to a signal degradation, and wherein the second position fix indicates a position of the positioning system receiver determined subsequent to the signal degradation; and in response to determining, at the positioning system receiver, a degradation event corresponding to the navigation signals from the plurality of navigation system transmitters, calculating, at a processor included in or communicatively coupled to the positioning system receiver, an estimated position fix of the positioning system receiver using at least one of the plurality of the records pairs stored in the database.

2. The method of claim 1, further comprising:

determining, at the processor, whether the database includes a target record corresponding to a position fix within a predetermined range of a current position fix of the positioning system receiver;

if it is determined that the database includes the target record, extracting from the database the record pair of which the target record is a part;

determining, at the processor, a relationship between (i) the current position fix of the positioning system receiver and (ii) the first position fix and the second position fix indicated by the record pair extracted from the database; and using, at the processor, the relationship to calculate the estimated position fix.

3. The method of claim 1, further comprising:

determining, at the processor, that the positioning system receiver is experiencing a degradation event;

locating a target record in the database corresponding to a current position fix of the positioning system receiver;

extracting, from the database, the record pair of which the target record is a part;

determining, at the processor, a relationship between (i) the current position fix of the positioning system receiver and (ii) the first position fix and the second position fix indicated by the record pair extracted from the database; and using, at the processor, the relationship to calculate the estimated position fix.

4. The method of claim 1, wherein calculating an estimated position fix of the positioning system receiver using at least one of the plurality of the records pairs stored in the database comprises one or more of the following:

interpolating, at the processor, a current altitude of the positioning system receiver based on altitudes recorded in the database records corresponding to the first position fix and the second position fix of the record pair;

estimating, at the processor, a current heading of the positioning system receiver based on headings of the receiver recorded in the records of the database corresponding to the first position fix and the second position fix of the record pair;

calculating, at the processor, the estimated position fix of the positioning system receiver based at least on the headings of the positioning system receiver recorded in the records of the database corresponding to the first position fix and the second position fix of the record pair; and calculating, at the processor, the estimated position fix of the positioning system receiver based at least on map data associated with a region surrounding and including the first position fix and the second position fix of the record pair in the database.

5. The method of claim 1, further comprising: using data stored in the database to facilitate re-acquisition of one or more of the navigation signals.

6. The method of claim 1, further comprising: using data stored in the database as a constraint for a next update of a Kalman Filter.

7. The method of claim 2, wherein the relationship is a topographical relationship.

8. The method of claim 3, wherein locating a target record in the database corresponding to a current position fix of the positioning system receiver comprises:

locating a target record pair; and based on the first position fix and the second position fix respectively indicated by the first record and the second record of the target record pair, defining a geographic area in which the current position fix of the positioning system receiver is located.

9. A positioning system apparatus comprising:

a positioning system receiver configured to receive navigation signals from a plurality of navigation system transmitters;

a processor included in or communicatively coupled to the positioning system receiver;

a database communicatively coupled to the processor, the database storing a plurality of records, the plurality of records including a plurality of record pairs, each record pair indicating a respective geographic region subject to signal degradation of the navigation signals from the plurality of navigation system transmitters, each record pair containing (i) a first position fix in a first record of the record pair and (ii) a second position fix in a second record of the record pair, the first position fix indicating a position of the positioning system receiver prior to a signal degradation, and the second position fix indicating a position of the positioning system receiver subsequent to the signal degradation; and one or more memory devices storing one or more routines executable by the processor, the one or more routines, when executed by the processor, collectively operative to:

cause the processor to determine a position fix of the positioning system receiver using the respective navigation signals, and in response to determining, at the positioning system receiver, a degradation event corresponding to the navigation signals from the plurality of navigation system transmitters, cause the processor to calculate an estimated position fix for the positioning system receiver using at least one of the plurality of the record pairs stored in the database.

10. The positioning system apparatus of claim 9, wherein the one or more routines are further operable to, when executed by the processor, cause the processor to:
    determine that the positioning system receiver is experiencing a degradation event;
    locate a target record in the database corresponding to a current position fix of the positioning system receiver;
    extract the record pair of which the target record is a part;
    determine a relationship between (i) the current position fix of the location positioning system receiver and (ii) the first position fix and the second position fix indicated by the record pair extracted from the database; and
    use the relationship to calculate the estimated position fix.

11. The positioning system apparatus of claim 9, wherein calculating the estimated position fix for the positioning system receiver using at least one of the plurality of records pairs stored in the database comprises one or more of the following:
    interpolating a current altitude of the positioning system receiver based on altitudes recorded in the records of the database corresponding to the first position fix and the second position fix of the record pair;
    estimating a current heading of the positioning system receiver based on headings of the receiver recorded in the records of the database corresponding to the first position fix and the second position fix of the record pair;
    calculating the estimated position fix of the positioning system receiver based at least on the headings of the positioning system receiver recorded in the records of the database corresponding to the first position fix and the second position fix of the record pair; and
    calculating the estimated position fix of the positioning system receiver based at least on map data associated with a region surrounding and including the first position fix and the second position fix of the record pair in the database.

12. The positioning system apparatus of claim 9, wherein the one or more routines are further operable to, when executed by the processor, cause the processor to: use data stored in the database to facilitate re-acquisition of one or more of the navigation signals.

13. The positioning system apparatus of claim 9, wherein the one or more routines are further operable to, when executed by the processor, cause the processor to: use data stored in the database as a constraint for a next update of a Kalman Filter.

14. The positioning system apparatus of claim 10, wherein the one or more routines are further operable to, when executed by the processor, cause the processor to:
    determine whether the database includes a target record corresponding to a position fix within a predetermined range of a current position fix of the positioning system receiver;
    if it is determined that the database includes the target record, extract from the database record pairs the record pair of which the target record is a part;
    determine a relationship between (i) the current position fix of the positioning system receiver and (ii) the first position fix and the second position fix indicated by the record pair extracted from the database; and
    use the relationship to calculate the estimated position fix.

15. The positioning system apparatus of claim 10, wherein the relationship is a topographical relationship.

16. The positioning system apparatus of claim 10, wherein the one or more routines are operable to, when executed by the processor, cause the processor to:
    based on the first position fix and the second position fix respectively indicated by the first record and the second record of the target record pair, define an area in which the current position fix of the positioning system receiver is located.

* * * * *